United States Patent
Saini et al.

(10) Patent No.: US 10,628,435 B2
(45) Date of Patent: Apr. 21, 2020

(54) EXTRACTING SEASONAL, LEVEL, AND SPIKE COMPONENTS FROM A TIME SERIES OF METRICS DATA

(71) Applicant: Adobe Inc., San Jose, CA (US)

(72) Inventors: Shiv Kumar Saini, Bangalore Karnataka (IN); Sunav Choudhary, Bokaro Steel (IN); Gaurush Hiranandani, Jaipur Rajasthan (IN)

(73) Assignee: Adobe Inc., San Jose, CA (US)

( * ) Notice: Subject to any disclaimer, the term of this patent is extended or adjusted under 35 U.S.C. 154(b) by 270 days.

(21) Appl. No.: 15/804,012

(22) Filed: Nov. 6, 2017

(65) Prior Publication Data

US 2019/0138643 A1 May 9, 2019

(51) Int. Cl.
- *G06F 7/00* (2006.01)
- *G06F 16/2458* (2019.01)
- *G06F 16/248* (2019.01)
- *H04L 29/06* (2006.01)

(52) U.S. Cl.
CPC ........ *G06F 16/2474* (2019.01); *G06F 16/248* (2019.01); *H04L 63/1425* (2013.01)

(58) Field of Classification Search
CPC .... G06F 16/48; G06F 16/5854; G06F 16/583; G06F 16/3344; G06F 16/7834; G06F 16/9535

See application file for complete search history.

(56) References Cited

U.S. PATENT DOCUMENTS

| | | | |
|---|---|---|---|
| 9,197,511 B2 * | 11/2015 | Mathis | H04L 41/145 |
| 9,430,535 B2 * | 8/2016 | Rastogi | G06F 16/2477 |
| 9,553,681 B2 * | 1/2017 | Hoffman | H04B 15/00 |
| 9,785,719 B2 * | 10/2017 | Ma | G06Q 30/00 |
| 9,866,954 B2 * | 1/2018 | Germain | H04R 3/00 |

(Continued)

OTHER PUBLICATIONS

Gupta, Manish, et al., "Outlier Detection for Temporal Data: A Survey," IEEE Transactions on Knowledge and Data Engineering, vol. 26, No. 9, Sep. 2014, 18 pages.

(Continued)

*Primary Examiner* — Daniel A Kuddus
(74) *Attorney, Agent, or Firm* — Kilpatrick Townsend & Stockton LLP

(57) ABSTRACT

Certain embodiments involve extracting seasonal, level, and spike components from a time series of metrics data, which describe interactions with an online service over a time period. For example, an analytical system decomposes the time series into latent components that include a seasonal component series, a level component series, a spike component series, and an error component series. The decomposition involves configuring an optimization algorithm with a constraint indicating that the time series is a sum of these latent components. The decomposition also involves executing the optimization algorithm to minimize an objective function subject to the constraint and identifying, from the executed optimization algorithm, the seasonal component series, the level component series, the spike component series, and the error component series that minimize the objective function. The analytical system outputs at least some latent components for anomaly-detection or data-forecasting.

18 Claims, 9 Drawing Sheets

(56) References Cited

U.S. PATENT DOCUMENTS

| | | | |
|---|---|---|---|
| 9,942,117 B1* | 4/2018 | Saini | H04L 41/14 |
| 2014/0108640 A1* | 4/2014 | Mathis | H04L 41/145 709/224 |
| 2014/0310235 A1* | 10/2014 | Chan | G06F 9/4881 707/603 |
| 2014/0344226 A1* | 11/2014 | Rastogi | G06F 16/2477 707/691 |
| 2015/0381648 A1* | 12/2015 | Mathis | H04L 41/145 726/22 |
| 2016/0019271 A1* | 1/2016 | Ma | G06Q 30/00 707/756 |
| 2016/0241346 A1* | 8/2016 | Hoffman | H04B 15/00 |
| 2016/0350173 A1* | 12/2016 | Ahad | G06F 11/0751 |
| 2017/0359361 A1* | 12/2017 | Modani | H04L 63/1425 |
| 2018/0039898 A1* | 2/2018 | Saini | G06F 11/3447 |

OTHER PUBLICATIONS

Vallis, Owen, et al., "A Novel Technique for Long-term Anomaly Detection in the Cloud," in Proceedings of the 6th USENIX Conference on Hot Topics in Cloud Computing, ser. HotCloud'14. Berkeley, CA, USA: USENIX Association, Jun. 2014, 6 pages.

Wang Chengwei, et al., A. Analytics, "Statistical Techniques Used in Anomaly Detection," https://marketing.adobe.com/resources/help/en_US/analytics/analysis-workspace/statistics_anomaly_detection.html. Oct. 2016, 3 pages.

A. T. For Microsoft, "Anomaly detection," https://gallery.cortanaintelligence.com/MachineLearningAPI/Anomaly-Detection-2, Apr. 22, 2015, 5 pages.

Laptev, N., et al., "Generic and Scalable Framework for Automated Time-Series Anomaly Detection," in Proceedings of the 21th ACM SIGKDD International Conference on Knowledge Discovery and Data Mining, ser. KDD '15. New York, NY, USA: ACM, 2015, 9 pages.

Donoho, David L., et al., "Optimally Sparse Representation in General (Nonorthogonal) Dictionaries Via L1 Minimization," Proc. Natl. Acad. Sci. USA, vol. 100, No. 5, Dec. 2002, 6 pages.

Hyndman, Rob J., et al., Forecasting with Exponential Smoothing: The State Space Approach (Springer Series in Statistics), 2008th ed. Springer, 7 2008, 6 pages.

Box, George E.P., et al., "Time Series Analysis: Forecasting and Control" (Wiley Series in Probability and Statistics), 5th ed. Wiley, Jun. 2015, 41 pages.

Lavin, Alexander, et al. , "Evaluating Real-Time Anomaly Detection Algorithms—The Numenta Anomaly Benchmark," Machine Learning and Applications (ICMLA), 2015 IEEE 14th International Conference, IEEE, Oct. 2015, 8 pages.

Ord, K., et al., "The M3-competition," International journal of forecasting, vol. 16, No. 4, pp. 433-436, 2000.

Clements, Michael P., et al., "Explaining the Results of the M3 Forecasting Competition," International Journal of Forecasting, vol. 17, No. 4, Jul. 4, 2001, 4 pages.

Natarajan, B.K., "Sparse Approximate Solutions to Linear Systems," SIAM Journal on Computing, vol. 24, No. 2, Apr. 1995, 8 pages.

Davis, Geoffrey, "Adaptive greedy approximations," Constructive Approximation, vol. 13, No. 1,1997, 47 pages.

Candes, Emmanuel, et al., "Robust Uncertainty Principles: Exact Signal Reconstruction From Highly Incomplete Frequency Information," IEEE Trans. Inf. Theory, vol. 52, No. 2, Jun. 2004, 41 pages.

Chandrasekaran, Venkat, et al., "Rank-Sparsity Incoherence for Matrix Decomposition," SIAM Journal on Optimization, vol. 21, No. 2, Jun. 2011, 24 pages.

Elhamifar, Ehsam, et al., "Sparse Subspace Clustering: Algorithm, Theory, and Applications," IEEE Trans. Pattern Anal. Mach. Intell., vol. 35, No. 11, Nov. 2013, 19 pages.

Xu, Linlin et al., "Survey on Sparsity in Geometric Modeling and Processing," Graphical Models, vol. 82, Jun. 2015, 21 pages.

Boyd, S. et al., "Convex Optimization", Cambridge University Press, 2004, 179 pages.

Domahidi, Alexander, et al., "Ecos: An Socp Solver for Embedded Systems," European Control Conference (ECC), Jul. 2013, 6 pages.

O'Donoghue, Brendan, et al., "Conic Optimization Via Operator Splitting and Homogeneous Self-Dual Embedding," Journal of Optimization Theory and Applications, vol. 169, No. 3, 2016, 24 pages.

Diamond, S., et al., "CVXPY: A Python-Embedded Modeling Language for Convex Optimization," Journal of Machine Learning Research, vol. 17, No. 83, 2016, 5 pages.

A. V. Oppenheim . Schafer, Discrete-Time Signal Processing (3rd Edition) (Prentice-Hall Signal Processing Series), 3rd ed. Pearson, 8 2009.

Hodge, Victoria J. et al., "A Survey of Outlier Detection Methodologies," Artificial Intelligence Review, vol. 22, No. 2, 2004,43 pages.

Aggarwal, Charu C. "Outlier analysis," in Data mining Springer, 2015, 52 pages.

De Gooijer, Jan G., et al., "25 years of time series forecasting," International journal of forecasting, vol. 22, No. 3, 2006, 31 pages.

Basseville, Michele, et al., "Detection of Abrupt Changes: Theory and Application" (Prentice Hall information and system sciences series). Prentice Hall, , 1993, 469 pages.

Gustafsson, F., "The Marginalized Likelihood Ratio Test for Detecting Abrupt Changes," IEEE Transactions on Automatic Control, vol. 41, No. 1, Jan. 1996, 1 page.

Cleveland, Robert B, et al., "Stl: A Seasonal Trend Decomposition Procedure Based on Loess," Journal of Official Statistics, vol. 6, No. 1, 1990, 31 pages.

Rosner, Bernard "Percentage Points for a Generalized ESD Many-Outlier Procedure," Technometrics, vol. 25, No. 2, May 1983, 165-172, Abstract, 5 pages.

Hochenbaum, Jordan, et al., "Automatic Anomaly Detection in the Cloud Via Statistical Learning," arXiv:1704.07706v1, Apr. 2017, 13 pages.

Tsay, Ruey S., "Time Series Model Specification in the Presence of Outliers," Journal of the American Statistical Association, vol. 81, No. 393, pp. 132-141, Mar. 1986, Abstract, 4 pages.

Chen, Chung, et al., "Joint Estimation of Model Parameters and Outlier Effects in Time Series," Journal of the American Statistical Association, vol. 88, No. 421, Mar. 1993, 14 pages.

Yamanishi, Kenji, et al., "A Unifying Framework for Detecting Outliers and Change Points From Non-Stationary Time Series Data," in Proceedings of the eighth ACM SIGKDD international conference on Knowledge discovery and data mining. ACM, Jul. 2002, 6 pages.

Perron, Pierre, "The Great Crash, The Oil Price Shock, and the Unit Root Hypothesis," Econometrica: Journal of the Econometric Society, vol. 57, No. 6, Nov. 1989, 70 pages.

Perron, Pierre, "Further Evidence on Breaking Trend Functions in Macroeconomic Variables," Journal of Econometrics, vol. 80, No. 2, , 1997, 46 pages.

Pesaran, Hashem M., et al., "Forecasting Time Series Subject to Multiple Structural Breaks," The Review of Economic Studies, vol. 73, No. 4, 2006, 37 pages.

Makridakis, Spyros, et al., "The M3-Competition: Results, Conclusions and Implications," International Journal of Forecasting, vol. 16, No. 4, 2000, 26 pages.

Hyndman, Rob J., et al., "Unmasking the Theta Method," International Journal Of Forecasting, vol. 19, No. 2, 2003, 7 pages.

Hyndman, Rob J., "Automatic Time Series Forecasting: The Forecast Package for R," Journal of Statistical Software, vol. 26, No. 3, Jul. 2008, 22 pages.

Hyndman, Rob J., "Forecast: Forecasting Functions for Time Series and Linear Models", r package version 8.0, https://robjhyndman.com/hyndsight/forecast8/, 2017, 7 pages.

Hyndman, Rob J, forecast: Forecasting functions for time series and linear models, 2016, r package version 7.3., http://github.com/robjhyndman/forecast, 2017 3 pages.

(56) References Cited

OTHER PUBLICATIONS

Vallis, O, et al., "Anomaly detection in r," https://github.com/twitter/AnomalyDetection, 2015, accessed 2017, 3 pages.

* cited by examiner

EXTRACTING SEASONAL, LEVEL, AND SPIKE COMPONENTS FROM A TIME SERIES OF METRICS DATA

TECHNICAL FIELD

This disclosure relates generally to computer-implemented methods and systems for applying anomaly detection and predictive modeling to data gathered via data networks, and more particularly relates to extracting seasonal, level, and spike components from a time series of metrics data.

BACKGROUND

When online services are used via networked computing environments, interactions with the online services generate large amounts of data that indicate various characteristics regarding the use of these online services. For example, various electronic interactions via online services (e.g., page views, website visits, webpage reloads) automatically generate data describing these actions (e.g., numbers of page views or website visits for each day of a given time period). Analysis of this data can identify issues that impact the ability of the online service to provide end-user experiences of sufficient quality, reliability, or both.

Examples of analysis that may be performed on datasets generated by online services is anomaly detection and predictive modeling, such as forecasting of future metrics values. An example of an anomaly is an outlier or group of outliers in a dataset that has a statistically significant deviation from a majority distribution. Anomaly detection involves finding trends in data that do not conform to expected or normal trends. Anomaly detection may be performed on machine-generated event log data (e.g., network logs) to detect, for example, changes in effectiveness for a given online service (e.g., network disruptions), responsiveness of end users to certain online content, indications of malware or other suspicious activity, or any other metric indicating a performance level associated with an online service.

Both anomaly detection and predictive modeling involve analyzing large amounts of time-series data. Time-series data that is generated by interactions with online services often includes metrics data resulting from a complicated mix of various latent components. Examples of latent components include seasonal variations, anomalous spikes in interactions within certain time intervals, and sudden changes in the average level of data traffic with respect to the online service. The amount of data available for analysis prevents (or makes impractical) reliance on human monitoring of data, and therefore requires executing automated algorithms to perform at least some of the data processing required for anomaly detection, data forecasting, or both. But, to accurately identify anomalies or provide accurate data forecasts, these automated algorithms must account for these seasonal patterns, spikes, and level changes.

Current solutions for accounting for these latent components may present disadvantages. In one example, anomaly-detection models or data-forecasting models, which are applied to time-series data, are configured using an assumption that certain latent components (e.g., spikes, level changes, etc.) are non-existent or involve a negligible contribution to the value of a metric under consideration. But these assumptions may prevent the detection of anomalies or reduce the accuracy of forecasts if the ignored latent component accounts for a significant portion of the time series of metrics data. In another example, an analyst may manually configure an anomaly-detection model or a data-forecasting model with data identifying seasonal patterns or other latent components. But this reliance on the analyst's prior knowledge of the relevant latent components results in imprecise or inaccurate models if the analyst's knowledge is incorrect or incomplete.

SUMMARY

Certain embodiments involve extracting seasonal, level, and spike components from a time series of metrics data. In one example, an analytical system accesses a time series having metrics data describing interactions with an online service over a time period. The analytical system decomposes the time series into latent components that include a seasonal component series, a level component series, a spike component series, and an error component series. The decomposition involves configuring an optimization algorithm with a constraint indicating that the time series is a sum of the seasonal component series, the level component series, the spike component series, and the error component series. The decomposition also involves executing the optimization algorithm to minimize an objective function subject to the constraint. The decomposition also involves identifying, from the executed optimization algorithm, the seasonal component series, the level component series, the spike component series, and the error component series that minimize the objective function. The analytical system outputs at least some of the latent components for anomaly-detection or data-forecasting.

These illustrative examples are mentioned not to limit or define the disclosure, but to provide examples to aid understanding thereof. Additional embodiments and examples are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
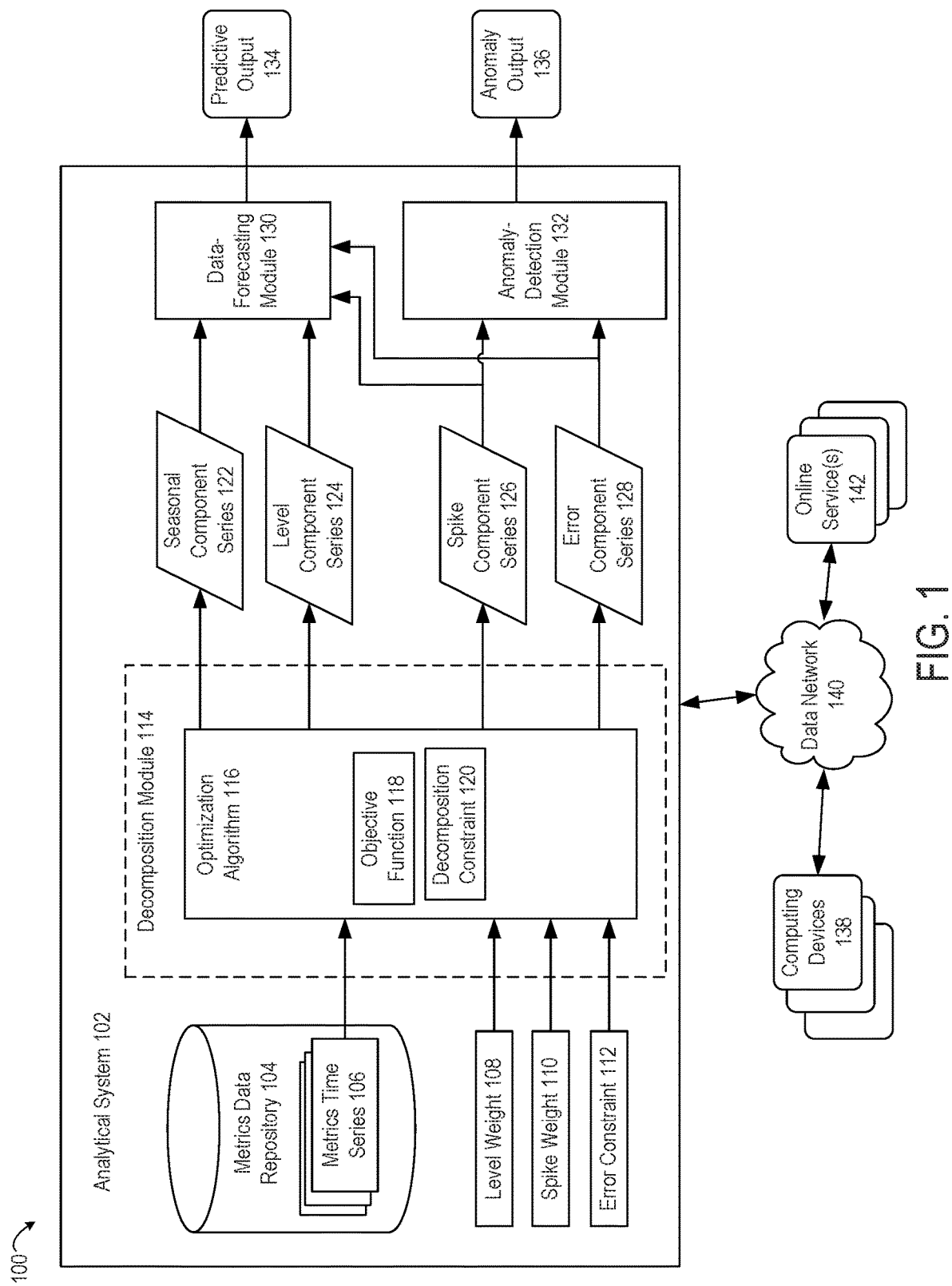
FIG. 1 illustrates an example of a computing environment in which an analytical system extracts seasonal, level, and spike components from a time series of metrics data for performing anomaly detection or data forecasting, according to certain embodiments.

Certain embodiments of the present disclosure include systems and methods for extracting latent components from a time series of metrics data. The latent components include, for example, seasonal variations that occur in some periodic manner, level variations that involve changes to average metrics values over time, and spike components that involve isolated changes in metrics values. In certain embodiments, an analytical system decomposes a time series, which includes a dataset of records describing certain metrics (e.g., page visits, network sessions, impressions, etc.), into these latent components. The decomposition involves minimizing an objective function that includes terms corresponding to the various latent components (e.g., a frequency transform of the seasonal component, a difference operator for the level component series, etc.). The objective function is minimized by finding a first time series corresponding to the seasonal component, a second time series corresponding to the level component series, and a third time series corresponding to the seasonal component. Using the same objective function allows the analytical system to jointly estimate these latent components in an automated manner, thereby reducing the need to assume the absence of certain components (e.g., spikes) or manually input certain latent component data (e.g., identification of seasonal variations). Thus, the resultant time series facilitate more accurate anomaly detection, data forecasting, or both.

The following non-limiting example is provided to introduce certain embodiments. In this example, an analytical system is used for analyzing metrics data describing the usage or performance of an online service. Examples of online services include web-based systems for providing content to end users over data networks. Examples of metrics for the online service include page views, website visits, revenue generated via the online service, and bounce rates. The analytical system accesses a time series that includes one or more metrics indicating interactions with the online service over a time period. Examples of data indicating or describing interactions with an online service include data accessed from server logs, device logs, etc.

Continuing with this example, the analytical system executes a decomposition process to jointly extract a seasonal component series, a level component series, a spike component series, and an error component series. For instance, the decomposition process could include accessing a suitable objective function. The objective function includes terms indicative of the seasonal component series, the level component series, and the spike component series. The objective function is subject to the constraint that the input time series (i.e., the metrics data to be decomposed) is equal to the sum of the seasonal component series, the level component series, the spike component series, and the error component series. The decomposition process involves minimizing the objective function subject to this constraint, where minimizing the objective function involves computing a set of the seasonal metrics values, a set of level metrics values, and a set of spike metrics values that result in a minimum value computed by the objective function. The decomposition process outputs the seasonal metrics values (i.e., the seasonal component series), the set of level metrics values (i.e., the level component series), and the set of spike metrics values (i.e., the spike component series) to other algorithms, such as anomaly-detection algorithms, data-forecasting algorithms, or both.

Certain embodiments provide improvements over existing anomaly-detection algorithms executed by computing systems. For example, because the same objective function is used to jointly estimate the various latent component series, the decomposition process can be executed in an automated fashion over large metrics datasets without the need of human inputs (e.g., specification of seasonal variations). Jointly estimating the latent component series also improves resulting models that analyze seasonal variations, spikes, etc., since the models are not required to assume knowledge of seasonality, maximum numbers of anomalies, or the presence of anomaly-free windows in a time series. Furthermore, certain embodiments involve sparse modeling of these latent components along with modeling an error component series as an auto-regressive moving average ("ARMA") model. These embodiments allow for more accurate determinations of anomaly detection, since the combined use of sparse modeling and ARMA models address the shortcomings that might be present in either modeling technique alone (e.g., the presence of seasonal effects being problematic for ARMA models, ARMA fitting being able to extract an uncorrelated noise process that would otherwise be infeasible to obtain by decomposing a sparse model, etc.).

As used herein, the term "metrics dataset" is used to refer to a set of data items having at least one data value indicating a metric associated with data network activity and at least one data value indicating an attribute of a computing device involved in the network activity, a user of the computing device, or some combination thereof. Examples of metrics associated with data network activity include clicks, web page visits, online transactions, or other interactions with online services.

As used herein, the term "metrics data" is used to refer to data having a numbered value indicating an observable characteristic with respect to an online service, data network activity, or other operations performed by one or more computing devices or otherwise using one or more computing devices.

As used herein, the term "anomaly detection" is used to refer to identification of an outlier or group of outliers in a dataset that has a statistically significant deviation from a majority distribution.

As used herein, the term "data forecasting" is used to refer to a prediction of one or more future values of a dataset based on historical values of a dataset.

As used herein, the term "latent components" is used to refer to a component of a time series or other dataset that contributes to the explicitly observed values in the time series in the other dataset. Data items in a latent component of a time series may not be directly observable.

As used herein, the term "seasonal component series" is used to refer to a latent component of a time series having values that fluctuate in a manner correlated with periods of time.

As used herein, the term "level component series" is used to refer to a latent component that exhibits a piecewise increase in an average value of a metrics time series or other dataset.

As used herein, the term "spike component series" is used to refer to a latent component that exhibits a spontaneous, anomalous, or other non-seasonal increase in values of a metrics time series or other dataset one or more particular time indices or other indices.

As used herein, the term "error component series" is used to refer to statistical noise, variance, or other residual latent components other than explainable latent components such as seasonal, level and spike components.

As used herein, the term "online service" is used to refer to one or more computing resources, including computing systems that may be configured for distributed processing operations, that provide one or more applications accessible via a data network. The collection of computing resources can be represented as a single service. In some embodiments, an online service provides a digital hub for browsing, creating, sharing, and otherwise using electronic content using one or more applications provided via the online service.

As used herein, the term "data item" is used to refer to a record or other object having values for multiple attributes associated with an online interaction. Examples of a data item include a record with multiple fields, a row having multiple columns, or any other data structure for grouping together multiple data values.

Computing Environment Example for Extracting Latent Components

FIG. 1 illustrates an example of a computing environment in which an analytical system extracts seasonal, level, and spike components from a time series of metrics data for performing anomaly detection or data forecasting, according to certain embodiments.

Referring now to the drawings, FIG. 1 illustrates an example of a computing environment 100 in which an analytical system 102 is used for extracting seasonal, level, and spike components from a time series of metrics data. The computing environment 100 includes the analytical system 102 (which can be included in or otherwise used by a marketing apparatus), one or more computing devices 138, and one or more online services 142. The analytical system 102, computing devices 138, and online services 142 are communicatively coupled via one or more data networks 140 (e.g., the Internet, one or more local area networks, one or more wide area networks, or some combination thereof). The analytical system 102 includes a metrics data repository 104 that stores one or more metrics times series 106, which are generated from computing devices 138 interacting with one or more online services 142 via a data network 140.

The analytical system 102 also includes a decomposition module 114 that decomposes a metrics time series 106 into various latent components, such as a seasonal component series 122, a level component series 124, a spike component series 126, and an error component series 128. One or more of these latent component series are provided to a data-forecasting module 130 of the analytical system 102 (which generates a data forecast or other predictive output 134), a data-forecasting module 130 of the analytical system 102 (which generates a data forecast or other predictive output 134), or both.

Figure 2:
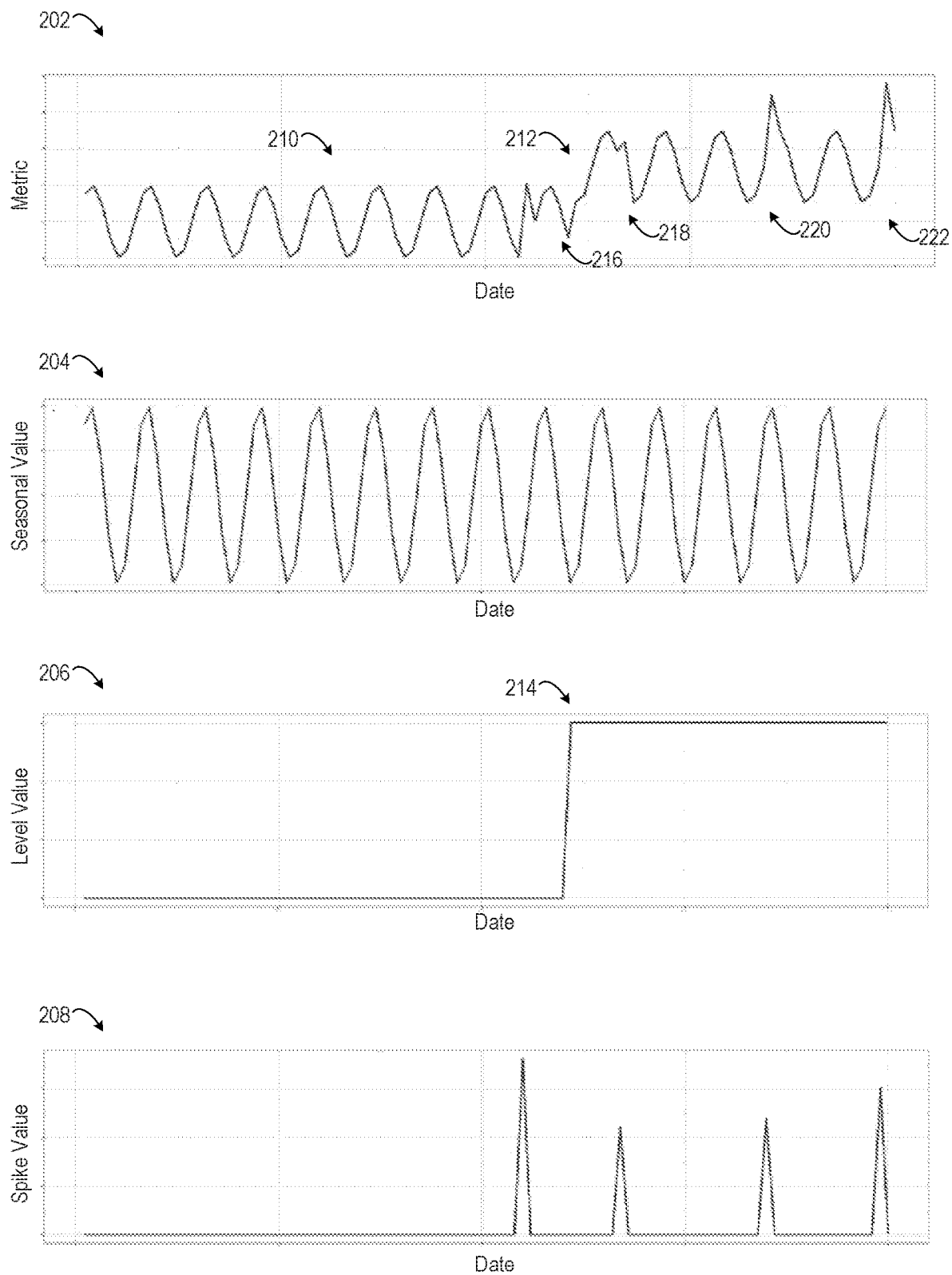
FIG. 2 illustrates examples of a time series and corresponding seasonal, level, and spike components extracted from the time series by the analytical system of FIG. 1, according to certain embodiments.

FIG. 2 illustrates examples of a time series 202, a corresponding seasonal component series 204, a corresponding level component series 206, and a corresponding spike component series 208. The analytical system 102 can execute the decomposition module 114 to extract the seasonal component series 204, the level component series 206, and the spike component series 208 from the time series 202. As depicted in FIG. 2, the seasonal component series 204 includes periodically varying values that contribute to the metrics values in the time series 202. An example of this seasonal contribution to the time series 202 is illustrated in region 210 of the time series 202, which has a waveform similar in shape to the seasonal component series 204. The level component series 206 includes a piecewise increase in an average value of the metrics time series 206. The contribution of the level component series 206 to the time series 202 is detectable by comparing region 212 of the time series 202 to region 214 of the level component series 206. The spike component series 208 includes non-repeating, temporary changes in the metrics value, where these spikes occur infrequently within a time window of the time series 202. The contribution of the spike component series 208 to the time series 202 is illustrated by comparing the non-zero values of the spike component series 208 to regions 216, 218, 220, and 224 of the time series 202 in which the metrics value diverge from a periodically varying waveform.

Returning to FIG. 1, the analytical system 102 includes one or more devices that provide and execute one or more engines for providing one or more digital experiences to the user. The analytical system 102 can be implemented using one or more servers, one or more platforms with corresponding application programming interfaces, cloud infrastructure and the like. In addition, each engine can also be implemented using one or more servers, one or more platforms with corresponding application programming interfaces, cloud infrastructure and the like. The analytical system 102 also includes a metrics data repository 104. The metrics data repository 104 is implemented as one or more databases or other data structures stored on one or more data servers. The metrics data repository 104 includes data that is used by the modules of the analytical system 102.

These modules include a decomposition module 114, which executes an optimization algorithm 116 to decompose a metrics time series 106 into latent components, which are used by a data-forecasting module 130, an anomaly-detection module 132, or both. The optimization algorithm 116 is configured to minimize an objective function 118. In some embodiments, the objective function includes tunable parameters (e.g., a level weight 108, a spike weight 110, and an error constraint 112). In other embodiments, one or more of the level weight 108, the spike weight 110, and the error constraint 112 are omitted. The optimization algorithm 116 minimizes the objective function 118 subject to a decomposition constraint 120. This process jointly estimates the latent (but interpretable) components of the metrics time series 106, which include the seasonal component series 122, the level component series 124, the spike component series 126, and the error component series 128. The optimization algorithm 116 also fits an ARMA model for the decomposition error. In some embodiments, the optimization algorithm 116 computes these latent components without requiring assumptions made by the existing time series analysis algorithms, such as knowledge of seasonality and presence of anomaly-free time windows, which improve the automation of anomaly-detection or data-forecasting systems by decreasing the amount of manual input required for decomposing a metrics time series 106. This facilitates more effective anomaly detection by the anomaly-detection module 132. This also makes a forecasting algorithm, which is executed by the data-forecasting module 130, more robust to the presence of anomalies in a relevant observation window. In some embodiments, the optimization algorithm 116 allows simultaneous detection of both point anomalies and change points as well as forecast. Examples of these decomposition, anomaly-detection, and data-forecasting operations are described in greater detail herein with respect to FIG. 3.

An example of a metrics dataset is a time series in which data items for a given metric are organized by a time period (e.g., number of page views per day over thirty days). An example of a segment is a time series in which portion of a metrics dataset is filtered based on a common feature with respect to computing devices or users of the computing devices involved in the data network activity. Each data item in a segment has an attribute having a metrics data value (e.g., "page views," "bounce rates," "website visits") and, in some cases, an attribute indicating a feature of a computing device or a user of the computing device that accesses one or more online services via a data network (e.g., a geographic attribute of the computing device or the user, a demographic attribute of the user, a hardware attribute of the computing device, a software attribute of the computing device, etc.).

In some embodiments, the decomposition module 114 processes data received from one or more online services 142, data generated from interactions with one or more online services 142 by computing devices 138, or any other data associated with one or more online services 142. The various metrics datasets in the metrics time series 106 are generated from interactions by the computing devices 138 with the online services 142. This data indicating or describing interactions can include data stored in server logs, device logs, etc. The online services 142 provide applications, data, and other functions that are accessed by one or more computing devices 138 via the Internet or one or more other suitable data networks 140. Examples of the online services 142 include (but are not limited to) social media websites, websites for purchasing products or services, etc.

The computing devices 138 execute respective user applications that are used to access the online services 142. In some embodiments, one or more of the computing devices includes at least one application supported by the analytical system 102. Examples of the user applications include, but are not limited to, web browsers for accessing websites provided by the online services and applications specific to the online services. Examples of the computing devices 138 include, but are not limited to, a personal computer ("PC"), tablet computer, a desktop computer, a processing unit, any combination of these devices, or any other suitable device having one or more processors.

In some embodiments, the metrics time series 106 includes data that is automatically generated or automatically provided to an analytical system 102 or other server system as a result of computing devices 138 interacting with an electronic message, web pages, or other electronic content provided via the online services 142. For example, electronic content provided by an online service 142 may include program code that causes a notification to be transmitted from a computing device 138 to the analytical system 102 (or another server system) in response to the electronic content being manipulated, used, or otherwise accessed at the computing device 138. The notification can be transmitted to the analytical system 102 (or another server system) without notifying a user of the computing device 138.

In other embodiments, the metrics time series 106 includes data that is provided to an analytical system 102 or other server system as a result of the computing device 138 accessing the online services 142 via one or more electronic messages. For example, a link to an online service 142 that is included in an electronic message may include a URL parameter that causes a web server, which provides access to the online service 142, to notify the analytical system 102 (or another server system) that a link has been clicked. A non-limiting example of the parameter is an alphanumeric string that provides an identifier for a campaign involving the transmission of the electronic messages. The web server can use the identifier included in the URL parameter to uniquely identify a visit to the website. The web server can respond to receiving the URL parameter by notifying the analytical system 102 (or another server system) that a computing device 138 to which an electronic message was transmitted accessed the online service 142 during a certain time period.

Each of the computing devices 138 is connected (or otherwise communicatively coupled) to an analytical system 102 via a data network 140. A user of one of the computing devices 138 uses various products, applications, or services supported by the analytical system 102 via the data network 140. Examples of the users include, but are not limited to, marketing professionals who use digital tools to generate, edit, track, or manage online content, or to manage online marketing process, end users, administrators, users who use document tools to create, edit, track, or manage documents, advertisers, publishers, developers, content owners, content managers, content creators, content viewers, content consumers, designers, editors, any combination of these users, or any other user who uses digital tools to create, edit, track, or manages digital experiences.

A digital tool is a computer-implemented tool used for performing a function or a workflow electronically. Examples of the digital tool include, but are not limited to, content creation tool, content editing tool, content publishing tool, content tracking tool, content managing tool, content printing tool, content consumption tool, any combination of these tools, or any other tool that can be used for creating, editing, managing, generating, tracking, consuming or performing any other function or workflow related to content. Digital tools include the analytical system 102. Digital experiences are experiences require an electronic device. Examples of the digital experience include content creating, content editing, content tracking, content publishing, content posting, content printing, content managing, content viewing, content consuming, any combination of these experiences, or any other workflow or function that can be performed related to content. Content, as described herein, is electronic content. Examples of the content include, but are not limited to, image, video, website, webpage, user interface, menu item, tool menu, magazine, slideshow, animation, social post, comment, blog, data feed, audio, advertisement, vector graphic, bitmap, document, any combination of one or more content, or any other electronic content.

Figure 3:
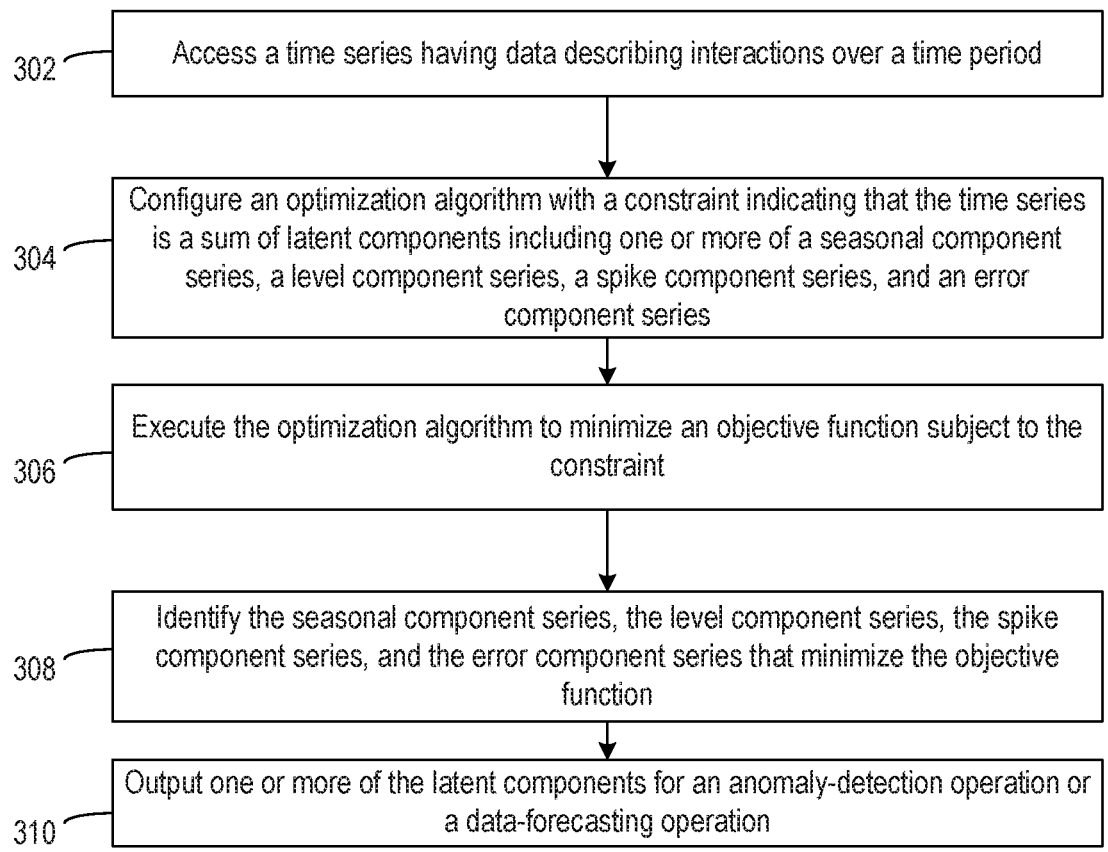
FIG. 3 illustrates an example of a method for extracting seasonal, level, and spike components from a time series of metrics data, according to certain embodiments.

Example of Sparse Decomposition of Time Series for Forecasting or Anomaly Detection FIG. 3 illustrates an example of a method 300 for extracting seasonal, level, and spike components from a time series of metrics data, according to certain embodiments. In some embodiments, one or more processing devices, such as the computing system described herein with respect to FIG. 4, implement operations depicted in FIG. 2 by executing suitable program code (e.g., the decomposition module 114) that implements one or more algorithms encompassed by the method 300. For illustrative purposes, the method 300 is described with reference to various examples described herein. Other implementations, however, are possible.

At block 302, the method 300 involves accessing a time series having data describing interactions over a time period. For instance, the analytical system 102 accesses a time series 106 from the metrics data repository 104. The metrics times series 106 is a metrics dataset. In some embodiments, the values of the metrics dataset indicate data network activity, such as interactions with online service 142.

To implement block 302, one or more processing devices execute the decomposition module 114 to access the metrics time series 106 from the metrics data repository 104. In some embodiments, the metrics data repository 104 is stored on a non-transitory computer-readable medium that is local to the computing system that executes the decomposition module 114. Accessing the metrics time series 106 involves transmitting suitable electronic signals via a data bus that communicatively couples the non-transitory computer-readable medium and the processing device. These signals cause at least some of the data from the non-transitory computer-readable medium to be stored in a random-access memory or other memory device that allows rapid retrieval of data for processing operations performed by the computing system that executes the decomposition module 114. In additional or alternative embodiments, the decomposition module 114 accesses, via a data network 140, at least some of the metrics time series 106 from a metrics data repository 104 stored on a non-transitory computer-readable medium that is remote from the computing system that executes the decomposition module 114. Accessing the metrics time series 106 involves transmitting suitable electronic signals via a network interface device that communicatively couples, via a data network, a computing system that executes the decomposition module 114 with another computing system that is communicatively coupled to the non-transitory computer-readable medium via a data bus or other form of local access. These signals cause at least some of the data from the non-transitory computer-readable medium to be transmitted over the data network, received via the network interface device of the computing system that executes the decomposition module 114, and stored in a random-access memory or other memory device that allows rapid retrieval of data for processing operations performed by the computing system that executes the decomposition module 114.

The metrics dataset accessed at block 302 includes data items (e.g., data samples, records, etc.) having metrics values. In some embodiments, metrics values indicate data network activity, such as a number of website visits, a number of page views, interactions with web pages (e.g., clicks, purchases, etc.), and other electronic transactions involving the online services 142. The metrics dataset includes segments. Each segment includes a respective subset of the data items having one or more common features with a participant in the data network activity (e.g., computing devices or users of the computing devices involved in the data network activity).

At block 304, the method 300 involves configuring an optimization algorithm with a constraint indicating that the time series is a sum of latent components including one or more of a seasonal component series, a level component series, a spike component series, and an error component series. For example, one or more processing devices executes the decomposition module 114 to decompose the metrics time series 106 accessed at block 302 into latent components comprising a seasonal component series 122, a level component series 124, a spike component series 126, and an error component series 128. The optimization algorithm 116 is configured to find these latent components that, when combined, form the metrics time series 106 (e.g., the entire metrics time series 106 or all metrics values for a particular metric).

At block 306, the method 300 involves executing the optimization algorithm to minimize an objective function subject to the constraint. To implement block 306, the decomposition module 114 executes an optimization algorithm 116, which accesses an objective function 118. The objective function 118 includes a sum of various terms representative of the latent components of the metrics time series 106 being decomposed. These terms include a seasonal term computed from the seasonal component series, a level term computed from the level component series, and a spike term computed from the spike component series compute estimated latent component series. The seasonal term, the level term, and the spike term are computed using model functions that encourage sparsity in the result latent component series. Sparsity in a time series involves, for example, a majority of the time indices in the time series being associated with metrics values of zero or near zero.

The following example illustrates the operation of the decomposition module 114 with respect to blocks 304 and 306 of the method 300. In this example, a time series y is modeled as y=s+t+d+e. In this model, the term s represents a time series corresponding to the seasonal component of y. The term t represents a time series corresponding to the level component series of y. The term d represents a time series corresponding to the spike component of y. The term e represents a time series corresponding to the spike component of y. At block 304, the decomposition module 314 is used to configure the optimization algorithm to implement the constraint y=s+t+d+e.

The decomposition module 114 decomposes the time series y into the four latent components s, t, d and e. This allows, for example, spikes in the metrics data, as indicated in series t, to be isolated and extracted from the time series y. Isolating the spikes from the metrics time series y into the spike component series t involves removing interference due to, for example seasonality (i.e., the seasonal component series s), level changes (i.e., the level component series t), and noise (i.e., the error component series e). In the absence of the embodiments described herein, decomposing the time series y is infeasible since the number of unknowns exceed the number of data points by a factor of four, making the decomposition problem under determined.

Embodiments described herein enable this decomposition of the metrics times series y by modeling the s, t and d components as being sparsely representable in interpretable bases that look significantly different from geometrical considerations. Appropriately formulated convex optimization problems could be used for estimating the sparse latent component series s, t, d and e from the metrics time series y. These estimates can be used by, for example, the data-forecasting module 130 to generate a predictive output (e.g., a data forecast) with a specific forecasting rule. Additionally or alternatively, one or more of the estimates can be used by the anomaly-detection module 132 to generate an anomaly output 136, which identifies statistically significant spikes or other anomalies in the metrics time series, by applying a specific detection rule.

Continuing with this example, the time series y and the corresponding latent component series include metrics values (e.g., observations) over a finite sized fixed window of size N, i.e., y, s, t, d, e$\in \mathbb{R}^N$. The optimization algorithm 116 solves the following convex optimization problem involving an objective function:

$$\underset{s,t,d,e}{\text{minimize}} \|Fs\|_1 + w_1\|\Delta t\|_1 + w_2\|d\|_1 \quad \text{P1}$$

$$\text{subject to } y = s + t + d + e \text{ and } \|e\|_2 \leq \rho.$$

In this example of an objective function 118, the term F denotes an N×N discrete Fourier transform matrix or other frequency transform matric, where F is multiplied by the seasonal component series s. $\|Fs\|_1$ is a seasonal term computed from the seasonal component series s. The term $\Delta: \mathbb{R}^N \to \mathbb{R}^{N-1}$ denotes the first difference operator, i.e. $k^{th}$ element of $\Delta t$ would be (t(k+1)−t(k)). The term $\|\Delta t\|_1$ is a level term computed from the level series t. The term $\|d\|_1$ is a level term computed from the level series t. The parameter $w_1$ represents the level weight 108. The parameter $w_2$ represents the spike weight 110. The parameter $\rho$ represents the error constraint 112.

The parameters $w_1$, $w_2$ and $\rho$ are tunable parameters. The level weight 108 models or otherwise indicates a contribution of the level component series to the time series. For example, decreasing the level weight 108 in the objective function 118 indicates that the level component series 124 provides (or should provide, in the model) a larger contribution to the metrics time series 106, and vice versa. The spike weight 110 models or otherwise indicates the contribution of the spike component series to the time series. For example, decreasing the spike weight 110 in the objective function 118 indicates that the spike component series 126 provides (or should provide, in the model) a larger contribution to the metrics time series 106, and vice versa.

The optimization algorithm 116 computes a solution to the Problem P1 (i.e., the objective function 118) that is the tuple ŝ, t̂, d̂, ê. In this tuple, ŝ is an estimated seasonal component series that is an estimate of the seasonal component series s, t̂ is an estimated level component series that is an estimate of the level component series t, and d̂ is an estimated spike component series that is an estimate of the spike component series d.

This example of the objective function 118 in problem (P1) promotes sparsity on the different components of the metrics time series y using the $l_1$ norm, which is an absolute value of the relevant term. The use of the $l_1$ norm of the vectors representing the various latent components results in sparsely distributed values in the latent component time series.

For example, the seasonal term Fs represents a frequency transformation of the seasonal component series s. The frequency transformation transforms the seasonal component series s from a time domain to a frequency domain. An example of Fs is a discrete Fourier transform ("DFT"). In the example of problem (P1), a sparse representation of the seasonal component series s in the discrete Fourier domain or other frequency domain is encouraged by using an objective function 118 having the $l_1$ norm (i.e., $\|Fs\|_1$) of this frequency transform. This basis is well suited to represent periodic signals.

The optimization algorithm 116 also uses an assumption that the level component series t is piecewise constant. This assumption allows shifts in the level to be captured more accurately in the estimated level component series t̂. The piecewise constant assumption on the level component series t balances simplicity of the model and over-fitting to the data. From a theoretical standpoint, piecewise constant functions form a complete basis so there is no loss of generality in this assumption. From practical considerations, slowly varying level values can be accurately represented by a sequence of infrequent level shifts or, in the example described herein, piecewise constant signals.

This assumption is implemented in the optimization algorithm 116 by using the level term $\|\Delta t\|_1$, which is the $l_1$-norm of a vector populated with differences between adjacent pairs of level values in the level component series l (i.e., $\Delta t_k = t(k+1)-t(k)$). In this example, (t(k+1)−t(k)) is expected to be non-zero for few values of $k \in \{0, \ldots, N-1\}$ in a slowly varying, piecewise constant level component series t. Including the level term $\|\Delta t\|_1$ in the objective function of Problem (P1) encourages sparsity within the estimated level component series t̂.

In this example, the spikes are assumed to occur infrequently, resulting in the spike component series d being sparse in the time domain. This assumption can be implemented by computing the spike term as an L1-norm of the spike component series d.

In block 308 of the method 300, the decomposition module 114 can compute the estimated error component series ê by subtracting the other estimated latent component series from the metrics time series y accessed at block 302. The error component series captures noise and model fitting errors in y. The effect of the error component series is controlled, in the optimization algorithm, by using the error constraint 112 as an upper bound on the energy of the error component series (e.g., $\|e\|_2^2 \leq \rho^2$).

The optimization algorithm 116 can solve problem (P1) in any suitable manner. In the example above, problem (P1) is a convex optimization problem, and more specifically, is equivalent to a second-order conic program ("SOCP"). Examples of a SOCP are described in S. Boyd and L. Vandenberghe, *Convex Optimization*. Cambridge University Press, 2004, which is incorporated by reference herein. Generic solvers for SOCPs include an embedded conic solver or SCS, which are included with a convex optimization modeling languages such as like CVXPY. Examples of these solvers and software are described in A. Domahidi, E. Chu, and S. Boyd, "Ecos: An socp solver for embedded systems," in 2013 *European Control Conference* (ECC), July 2013, pp. 3071-3076; B. O'Donoghue, E. Chu, N. Parikh, and S. Boyd, "Conic optimization via operator splitting and homogeneous self-dual embedding," *Journal of Optimization Theory and Applications*, vol. 169, no. 3, pp. 1042-1068, 2016; and S. Diamond and S. Boyd, "CVXPY: A Python-embedded modeling language for convex optimization," *Journal of Machine Learning Research*, vol. 17, no. 83, pp. 1-5, 2016, all of which are incorporated by reference herein. One or more of these solvers can be included in the optimization algorithm 116.

Returning to FIG. 3, at block 308, the method 300 involves identifying the seasonal component series, the level component series, the spike component series, and the error component series that minimize the objective function. For example, the decomposition module 114 implements block 308 by selecting one or more latent component series that resulted in the minimization of the objective function at block 308.

At block 310, the method 300 involves outputting one or more of the latent components for an anomaly-detection operation or a data-forecasting operation. In one example, the decomposition module 114 implements block 310 by outputting the spike component series 126 and the error component series 128 to an anomaly-detection module 132. The anomaly-detection module 132 executes an anomaly detection algorithm that uses the error component series 128 to identify values from the spike component series 126 that are sufficiently significant to be considered "true" spikes. In another example, the decomposition module 114 implements block 310 by outputting at least the seasonal component series and the level component series 124 (and, in some cases, the spike component series 126 and the error component series 128) to at least the seasonal component series and the level component series 124 and thereby generates one or more predictive outputs 134, such as a predicted metrics times series for a subsequent time window. More detailed examples of these anomaly-detection and data-forecasting operations are described below.

The analytical system 102 can output one or more of the latent components in any suitable manner. In some embodiments, the decomposition module 114 stores the latent component time series (i.e., one or more of a seasonal component series 122, a level component series 124, a spike component series 126, and an error component series 128) in a data structure of a non-transitory computer-readable medium that is accessible to the data-forecasting module 130, the anomaly-detection module 132, or both. An example of such a data structure is the metrics data repository 104, though any data structure in a non-transitory computer-readable medium accessible to the relevant modules can be used. In other embodiments, the decomposition module 114 configured the analytical system 102 to transmit the latent component time series (i.e., one or more of a seasonal component series 122, a level component series 124, a spike component series 126, and an error component series 128) to one or more computing devices executing the data-forecasting module 130, the anomaly-detection module 132, or both. The transmissions may be performed over one or more data networks.

In some embodiments, the module 144 uses an error model of the error component series e as a $\{p, q\}^{th}$ order ARMA process. This modeling method can facilitate identification of statistically significant spikes in the spike component series d in anomaly-detection operations, extrapolating the error component series e for data-forecasting operations, etc. The error model includes ARMA coefficients $\phi_1, \phi_2, \ldots, \phi_p, \theta_1, \theta_2, \ldots, \theta_q \in (-1, 1)$ and a zero-mean white noise process $\eta \in \mathbb{R}^N$. The error component series e is modeled such that elements of the error component series e satisfy, for every $p+1 \leq i \leq N$, the following constraint:

$$e(k) = \Sigma_{i=1}^p \phi_i e(k-i) + \Sigma_{i=1}^q \theta_i \eta(k-i) + \eta(k) \qquad (1).$$

In the error model, the ARMA coefficients are collected into the vectors $\phi \in (-1, 1)^p$ and $\theta \in (-1, 1)^q$, where $\phi(i) = \phi_i$ for $1 \leq i \leq p$ and $\theta(i) = \theta_i$ for $1 \leq i \leq q$. A unit lag operator in matrix form is represented by $L \in \mathbb{R}^{N \times N}$, where $$L(i, j) = \begin{cases} 1, & j - i = 1, \\ 0, & \text{otherwise} \end{cases} \qquad (2).$$

Using this notation, the error model can be rewritten using matrix notation as $$e = \Sigma_{i=1}^p \phi(i) L^i e + \Sigma_{i=1}^q \theta(i) L^i \eta + \eta \qquad (3).$$

For further brevity, the linear operator $\mathcal{L}: \mathbb{R}^r \to \mathbb{R}^{N \times N}$ can be defined for every $1 \leq r \leq N$ as follows. For any vector $z \in \mathbb{R}^r$, $$\mathcal{L}(z) \triangleq \sum_{i=1}^r z(i) L^j. \qquad (4)$$

This leads to the error model from equation (3) being succinctly representable as $$e = \mathcal{L}(\phi) e + \mathcal{L}(\theta) \eta + \eta \qquad (5).$$

Anomaly-Detection Example Using Decomposed Metrics Time Series

In one example involving anomaly detection, the anomaly-detection module 132 computes error-bound pairs from the error component series. Each error-bound pair corresponds to a respective index from the error component series. For instance, at a particular time index, a spike value or other metrics value is considered statistically insignificant if the value falls within a range defined by a first value from an error-bound pair and a second value from an error-bound pair. In an anomaly-detection operation, the anomaly-detection module 132 identifies a subset of spike values using these error-bound pairs. To do so, the anomaly-detection module 132 selects, for each spike value, an error-bound pair having a common index (i.e., the same time index) with respect to the spike value. If the spike value is outside a range of spike values bounded by the selected error-bound pair for the common index, the anomaly-detection module 132 adds that spike value to the subset of spike values. The anomaly-detection module 132 outputs the subset of spike values, whose statistical significance has been detected using the error-bound pairs, as an anomaly set (i.e., the anomaly output 136).

For instance, the anomaly-detection module 132 applies a detection rule involving the estimated spike component series $\hat{d}$ and an ARMA-fitted estimated error component series $\hat{e}$ that minimizes or otherwise reduce a type-I error (also known as the false alarm rate) to an acceptable rate. The detection rule allows detected spikes in the estimated spike component series $\hat{d}$ that are significantly different from the expected noise to be identified as anomalous with reasonable confidence, while filtering spikes that are not significantly different from the expected noise. In this example, the detection rule is configured based on an assumption that the distribution of the estimated error $\hat{e}$ approximates that of the true error e and that $\hat{e}$ is a stationary Gaussian process generated by a zero-mean white Gaussian noise process.

Continuing with this anomaly-detection example, the anomaly-detection module 132 applies a detection rule that tries to upper bound the type-I error by $\alpha\%$. To compute the type-I error, the anomaly-detection module 132 (or other suitable program code) performs error-derivation operations. The error-derivation operations include estimating the parameters $\varphi$ and $\theta$ of the ARMA process using the following formula:

$$\hat{e} = \mathcal{L}(\phi) \hat{e} + \mathcal{L}(\theta) \eta + \eta \qquad (6).$$

The error-derivation operations also include calculating the unconditional variance of $\hat{e}$ using the following formula:

$$\Omega = W \text{Var}[\eta] W^T \qquad (7).$$

In equation (7), $$W \triangleq [I - \mathcal{L}(\phi)]^{-1} [I + \mathcal{L}(\theta)]$$

and $(\cdot)^T$ represents a matrix transpose operator.

The anomaly-detection module 132 identifies the anomalous spikes based on the results of the error-derivation operations. For instance, the anomalous spikes are at the indices n for which one of $\hat{d}(n) \leq z_{\alpha/2}\sqrt{\Omega(n,n)}$ or $\hat{d}(n) \geq z_{(1-\alpha)/2}\sqrt{\Omega(n,n)}$ is true. The term $z_x$ is the $x^{th}$ percentile of a Standard Normal distribution. (In this example, the values $z_{\alpha/2}\sqrt{\Omega(n,n)}$ and $z_{(1-\alpha)/2}\sqrt{\Omega(n,n)}$ are an error-bound pair for the common index n of the spike value $\hat{d}(n)$.)

By improving the accuracy with which anomalous values can be identified, certain embodiments of the analytical system 102 provide computer-implemented improvements that address problems that involve tracking network activity. Examples of problems that involve tracking network activity include identifying communication problems over the Internet and data networks, increasing engagement with customized online content that requires access via the Internet and data networks, etc. The method 300 allows these problems to be addressed by extracting spike component series, from which anomalous values are identified, in a manner that would be infeasible without the computed-implemented embodiments described herein. For instance, the method 300 allows anomalous data to be automatically identified even if large volumes of data (e.g., thousands or millions of data items) are used to define the metrics.

In one example, the identification of anomalous metrics values may allow communication problems in data centers or hubs of an online service to be identified and addressed. For instance, anomalous metrics related to latency that are specific to computing devices in certain geographic regions may be used to more effectively identify problems with communication equipment servicing those geographic regions. Use of the automated method described above can allow these problems to be identified without human intervention, and thereby prevent additional delays and problems with network communication that would otherwise result from relying on human intervention to notice or otherwise detect anomalous network activity. Other examples of network-related problems addressed by anomaly detection algorithms, which are improved by certain embodiments described herein, include identifying malware, identifying suspicious activity indicating an intrusion into a data network, or identifying performance levels associated with an online service.

Data-Forecasting Example Using Decomposed Metrics Time Series

In some embodiments, the data-forecasting module 130 performs one or more data-forecasting operations using the results of the decomposition performed in the method 300. For example, the data-forecasting module 130 computes a predicted seasonal component series based on one or more frequency components of the seasonal component series 122 extracted from the metrics times series 106. The data-forecasting module 130 also sets values of a predicted level component series to a level value selected from the level component series, such as the last level change in the level component series 124 extracted from the metrics time series 106. The data-forecasting module 130 combines at least these predicted seasonal and level component series into the predicted metrics time series.

The following non-limiting example is provided to illustrate a data-forecasting operation performed by the data-forecasting module 130. In this example, the forecasting interval lies outside of the size N window used by the optimization algorithm to decompose the metrics time series y. Explicit time indexing for the time series is used to avoid confusion. Accordingly, the infinite length time series y over the $(n_1-n_0+1)$ size contiguous observation window $n_0$, $n_0+1, \ldots, n_1-1, n_1$ (inclusive of both end points) is denoted in this example by the shorthand $y(n_0:n_1)$. Thus, the estimated decomposition of $y(n_0:n_1)$ as given by problem (P1) is denoted by the tuple $(\hat{s}(n_0:n_1), \hat{t}(n_0:n_1), \hat{d}(n_0:n_1), \hat{e}(n_0:n_1))$.

This forecasting example uses the '~' symbol to denote forecasts, where forecasting rules are derived assuming that the forecast for subsequent values of the time series y follow the same additive model as described in other example herein. Thus, the forecast for y over the time window from $n_2$ to $n_3$ is denoted by $\tilde{y}(n_2:n_3)$. The forecast $\tilde{y}(n_2:n_3)$ is assumed to satisfy the following constraint:

$$\tilde{y}(n_2:n_3) = \tilde{s}(n_2:n_3) + \tilde{t}(n_2:n_3) + \tilde{d}(n_2:n_3) + \tilde{e}(n_2:n_3).$$

The terms $\tilde{s}(n_2:n_3)$, $\tilde{t}(n_2:n_3)$, $\tilde{d}(n_2:n_3)$, and $\tilde{e}(n_2:n_3)$ respectively denote forecasts for the time series segments $s(n_2:n_3)$, $t(n_2:n_3)$, $d(n_2:n_3)$, and $e(n_2:n_3)$.

The data-forecasting module 130 computes the season forecast $\tilde{s}(n_2:n_3)$ by extrapolating, in the time domain, the estimated seasonal frequencies in $\hat{s}(n_0:n_1)$, using the shift property of a DFT or other suitable frequency transform F. This is equivalent to a periodic extension of the time series segment $\hat{s}(n_0:n_1)$ to an infinite discrete periodic time series satisfying $\tilde{s}(n_0+m\cdot(n_1-n_0+1): n_1+m\cdot(n_1-n_0+1))=\hat{s}(n_0:n_1)$. The data-forecasting module 130 uses a model assumption that $n_0$ and $n_1$ are sufficiently separated such that s contains no seasonal frequencies smaller than $$\frac{1}{n_1-n_0+1},$$

since these frequencies cannot be effectively captured by a window of size $(n_1-n_0+1)$.

The data-forecasting module 130 computes the level forecast $\tilde{t}(n_2:n_3)$ by setting $\tilde{t}(n_2:n_3)=\hat{t}(n_2-1)\cdot 1$. This operation implements a model assumption that level changes are infrequent and cannot be predicted easily. Since level changes are expected to be infrequent relative to the granularity of the time series, the data-forecasting module 130 computes a forecast that lacks level changes in the forecast period subsequent to the time period N used for decomposing the metrics time series y.

The data-forecasting module 130 computes the spike forecast $\tilde{d}(n_2:n_3)$ by setting $\tilde{d}(n_2:n_3)=0$. This operation implements a model assumption that spikes are anomalies that cannot be predicted easily. Since spikes are expected to be infrequent relative to the granularity of the time series, the data-forecasting module 130 computes a forecast that lacks spikes for the forecast period.

The data-forecasting module 130 computes the error forecast $\tilde{e}(n_2:n_3)$ from an ARMA-based model of the error component series. The data-forecasting module 130 uses an error model assuming that the stationary ARMA model parameters for the error component series e can be approximated by the corresponding parameters for $\tilde{e}$, (viz. $\hat{\phi}$, $\hat{\theta}$ and $\hat{\eta}$) estimated via equation (6) over a time window from $n_0$ to $n_1$. The data-forecasting module 130 uses the following forecasting function:

$$\tilde{e}(n_2:n_3) = \mathcal{L}(\hat{\phi})\tilde{e}(n_2:n_3) + [I + \mathcal{L}(\hat{\theta})]\tilde{\eta}(n_2:n_3) \qquad (8).$$

In equation (8), $\tilde{\eta}(n_2:n_3)$ is the forecast for $\eta(n_2:n_3)$. Since $\hat{\eta}(n_0:n_1)$ was estimated from equation (6) and $\eta$ is a zero-mean process by assumption, $n_2 > n_0$ is assumed and the following forecasting expression for $\tilde{\eta}(n_2:n_3)$ results:

$$\tilde{\eta}(n) = \begin{cases} 0, & \text{if } \max\{n_1, n_2\} < n \leq n_3, \\ \hat{\eta}(n), & \text{if } n_0 \leq n \leq \max\{n_1, n_2\} \end{cases} \qquad (9)$$

In other words, the data-forecasting module 130 sets those values in $\tilde{\eta}(n_2:n_3)$ to zero that are neither observed nor estimated. The data-forecasting module 130 inputs $\tilde{\eta}(n_2:n_3)$ into equation (8) and solves for $\tilde{e}(n_2:n_3)$ in the resultant linear equation to calculate the forecast $\tilde{e}(n_2:n_3)$.

In some embodiments, the analytical system 102 can perform additional operations, such as causing a display device, either local to the analytical system 102 or at a remote computing device, to display a visualization of the decomposed metrics times series. In some embodiments, these output operations include causing a display device to render a graphical interface that includes one or more time series visualization graphics, such as the graphics depicted in FIG. 2 above. Causing a display device to display the graphical interface may involve transmitting suitable commands between the processing device and the display device via a local data bus, transmitting suitable commands between the processing device and the display device via one or more data networks, etc. In additional or alternative embodiments, these output operations transmitting one or more time series visualization graphics from the analytical system 102 that to a second computing system, such as a user device having a display device, via one or more data networks.

Computing System Example

Figure 4:
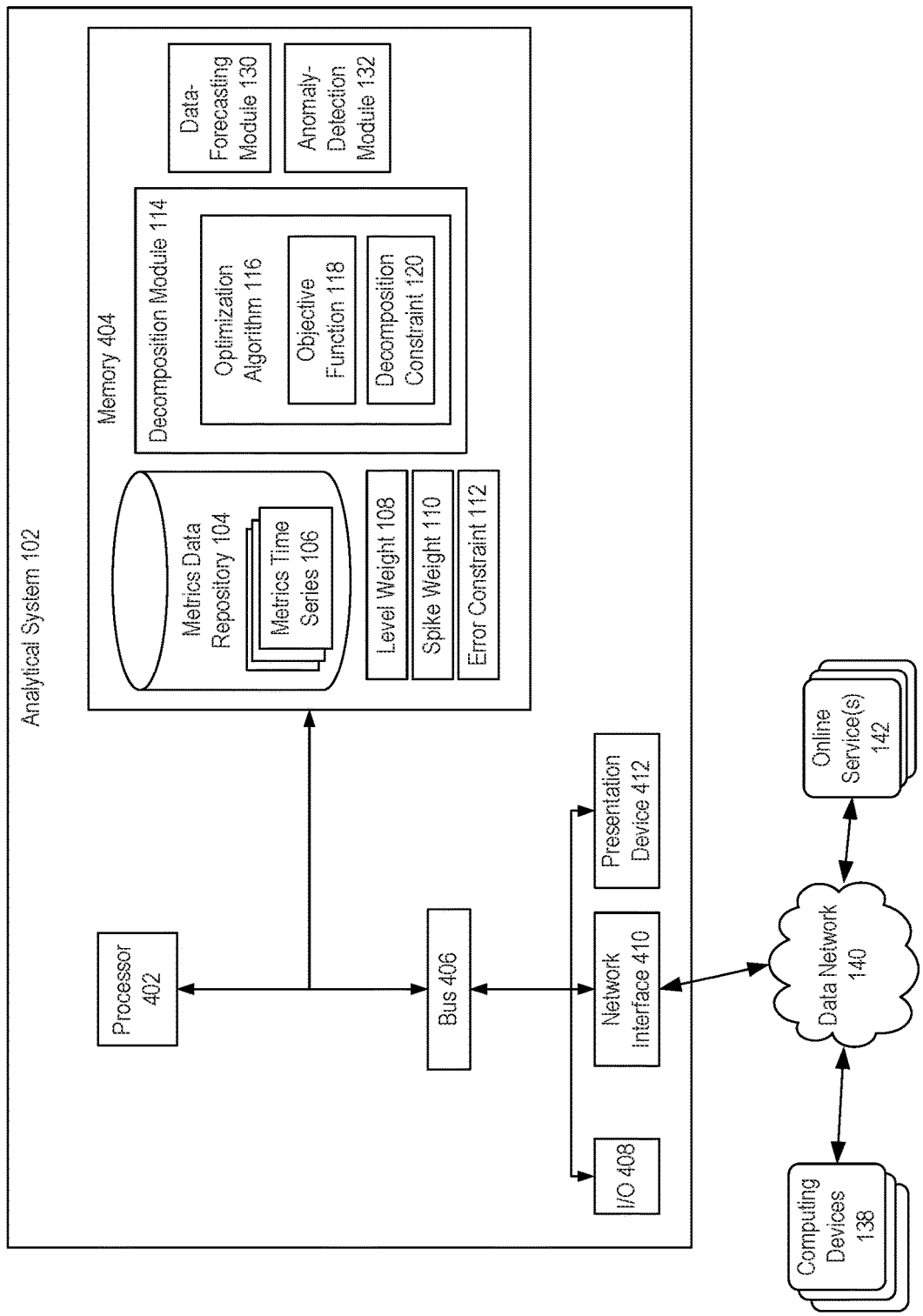
FIG. 4 illustrates an example of a computing system that executes an analytical application for extracting seasonal, level, and spike components from a time series of metrics data, according to certain embodiments.

Any suitable computing system or group of computing systems can be used for performing the operations described herein. FIG. 4 illustrates an example of a computing system (e.g., analytical system 102), having hardware components for extracting seasonal, level, and spike components from a time series of metrics data. The depicted example of the analytical system 102 includes one or more processors 402 communicatively coupled to one or more memory devices 404. The processor 402 executes computer-executable program code stored in the memory device 404, accesses information stored in the memory device 404, or both. Examples of the processor 402 include a microprocessor, an application-specific integrated circuit ("ASIC"), a field-programmable gate array ("FPGA"), or any other suitable processing device. The processor 402 can include any number of processing devices, including one. One or more processors 402 are configured by program code to implement the operations described above, such as the operations depicted in FIG. 3 that are described with respect to processing devices.

The memory device 404 includes any suitable non-transitory computer-readable medium for storing one or more of the metrics data repository 104, the decomposition module 114, the data-forecasting module 130, the anomaly-detection module 132, and any other data or program code described herein. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript. One or more memory devices 404 are used to implement the operations described above, such as the operations depicted in FIG. 2 that are described with respect to one or more non-transitory computer-readable media.

The analytical system 102 may also include a number of external or internal devices such as input or output devices. For example, the analytical system 102 is shown with an input/output ("I/O") interface 408 that can receive input from input devices or provide output to output devices. A bus 406 can also be included in the analytical system 102. The bus 406 can communicatively couple one or more components of the analytical system 102. In some embodiments, the bus 406 is used to implement the operations described above with respect to FIG. 2 that involve communicating signals via a data bus.

The analytical system 102 executes program code that configures the processor 402 to perform one or more of the operations described herein. The program code includes, for example, one or more of the decomposition module 114, the data-forecasting module 130, the anomaly-detection module 132, and other suitable applications that perform one or more operations described herein. The program code may be resident in the memory device 404 or any suitable computer-readable medium and may be executed by the processor 402 or any other suitable processor. In some embodiments, the program code described above is stored in the memory device 404, as depicted in FIG. 4. In additional or alternative embodiments, the program code described above is stored in one or more memory devices accessible via a data network.

The analytical system 102 can access the metrics time series 106 in any suitable manner. In some embodiments, the metrics time series 106 is stored in one or more memory devices accessible via a data network 140, as in the example depicted in FIG. 4. In additional or alternative embodiments, some or all of the metrics time series 106 is stored in the memory device 404.

The analytical system 102 depicted in FIG. 4 also includes at least one network interface 410. The network interface 410 includes any device or group of devices suitable for establishing a wired or wireless data connection to one or more data networks 140. Non-limiting examples of the network interface 410 include an Ethernet network adapter, a modem, and/or the like. The analytical system 102 is able to communicate with one or more online services 142 using the network interface 410. In some embodiments, the network interface 410 is used to implement the operations described herein that involve communicating signals via a data network.

In some embodiments, the analytical system 102 also includes the presentation device 412 depicted in FIG. 4. A presentation device 412 can include any device or group of devices suitable for providing visual, auditory, or other suitable sensory output. Non-limiting examples of the presentation device 412 include a touchscreen, a monitor, a speaker, a separate mobile computing device, etc. In some embodiments, the presentation device 412 can include a remote client-computing device that communicates with the analytical system 102 using one or more data networks described herein. Other embodiments can omit the presentation device 412.

Experimental Examples

Various experiments have evaluated the performance of certain embodiments with respect to both anomaly detection as well as forecasting and present results as compared to other approaches, both for synthetically generated and real datasets. The experiments involved an SD, SD-L Dataset, an NAB Dataset, NAB-HR Dataset, WM Dataset, and a M3

Dataset. The description of these experimental samples is provided for illustrative purposes.

Figure 5:
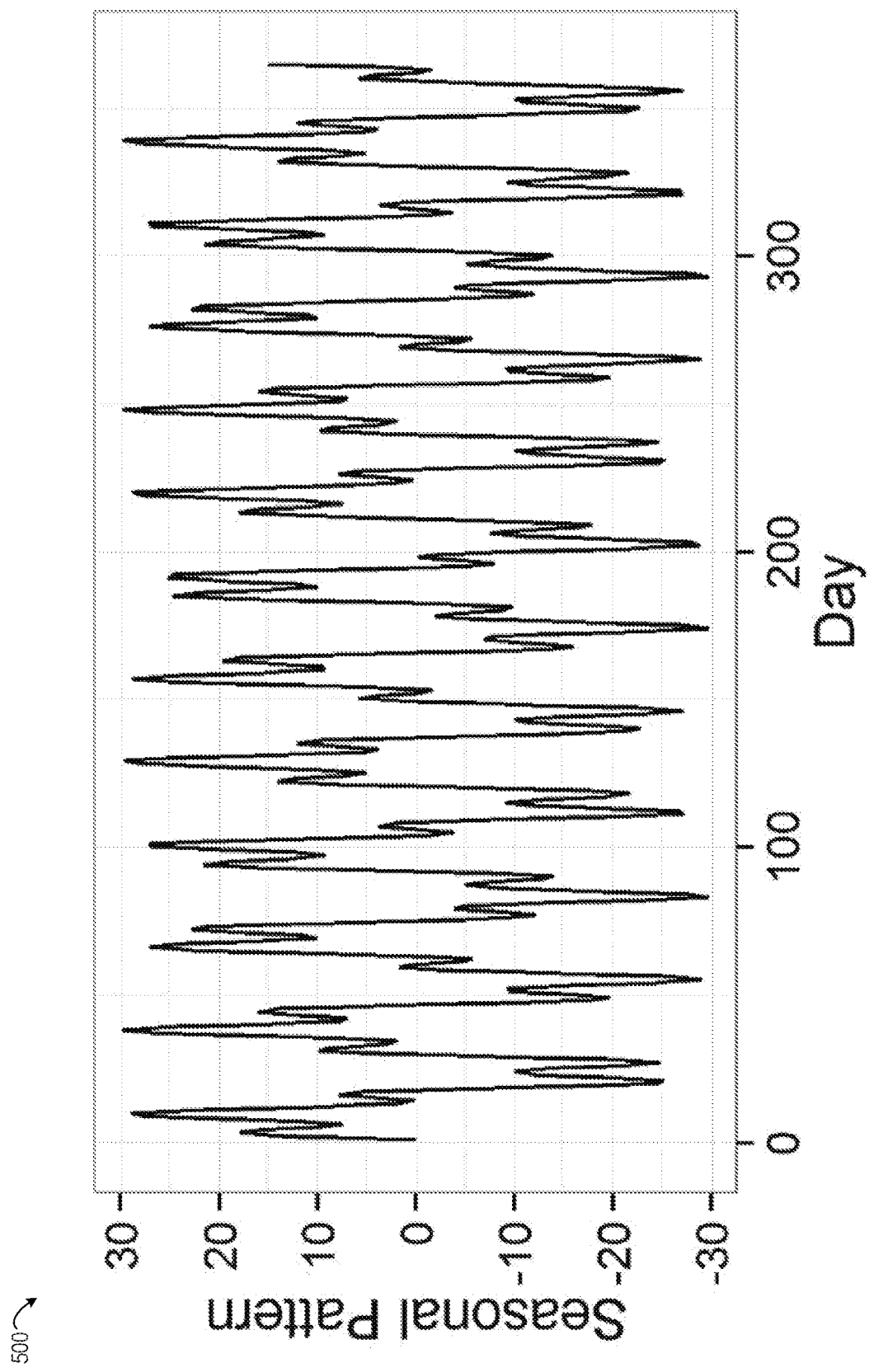
FIG. 5 depicts an example of an experimental seasonal component of a time series with two seasonal patterns, according to certain embodiments.

The SD Dataset, a synthetic dataset, included 480 synthetic time series. Each time series was a sum of four different components: level, seasonal pattern, spikes, and error. The SD dataset included a wide variety of time series patterns (e.g., no seasonality to multiple seasonal patterns, no spike to 5% of observations as spikes, no change in level to multiple changes in level, and different sample sizes). FIG. 5 depicts an example of an experimental seasonal component 500 of a time series with two seasonal patterns.

In the SD dataset, the seasonality variations included no seasonality, one sinusoidal seasonality with a time period of seven days, and two additive sinusoids with periods of seven days and thirty days and respective amplitudes ten and twenty. The mixture of seven-day/weekly and thirty-day/monthly seasonal pattern is commonly observed for web metrics (e.g., daily visits on a website).

Figure 6:
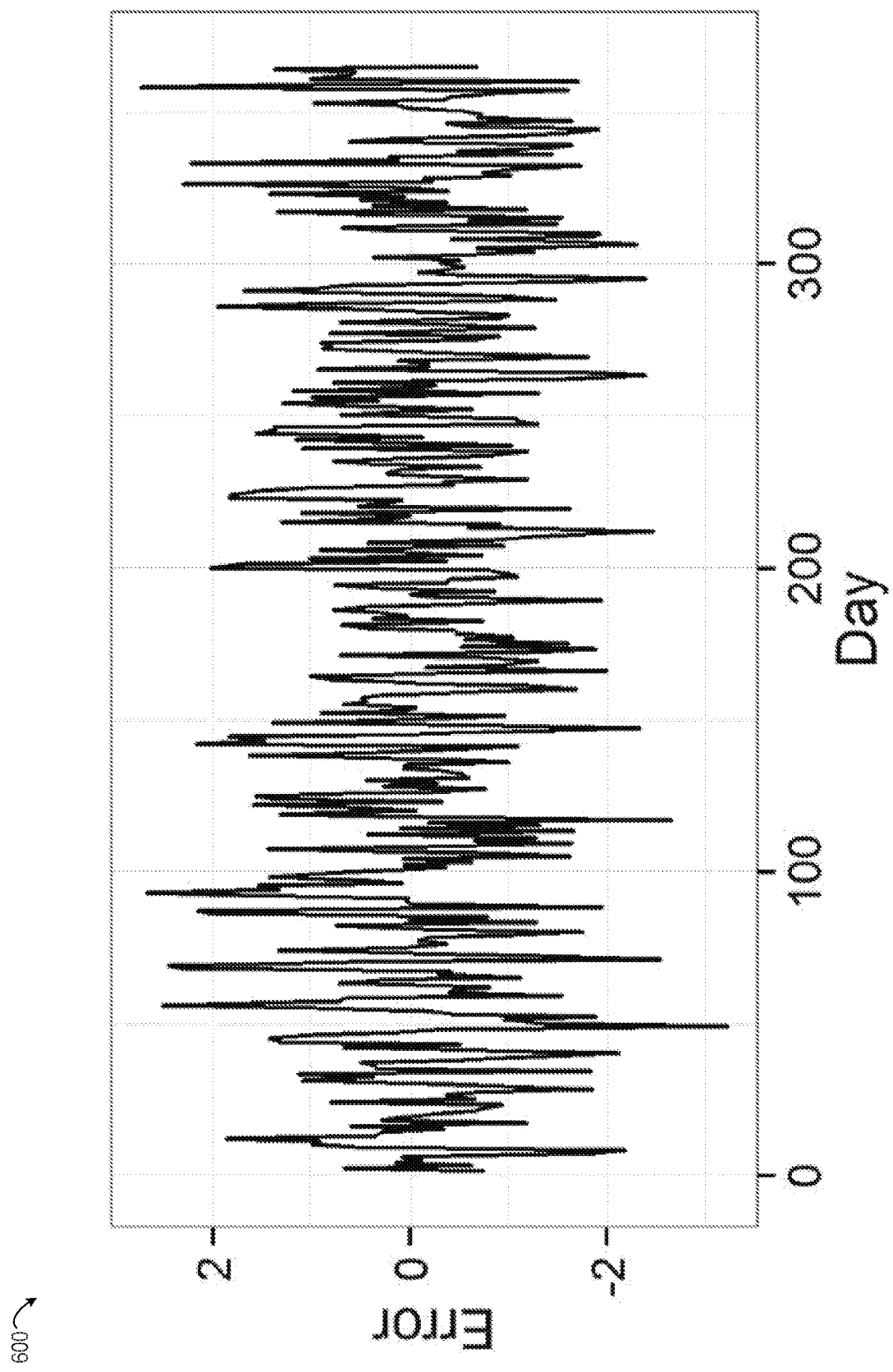
FIG. 6 depicts an example of an experimental error component of a time series, according to certain embodiments.

In the SD dataset, an additive error component was considered that follows an AR(1) process, which is generated using the relation $$e(n)=0.3e(n-1)+\eta(n) \qquad (10),$$

with $\eta(n)$ generated as per a standard normal distribution. To discard the effects of the initial condition (i.e. the realization of $\eta(0)$) on the error, the first 100 observations were ignored. FIG. 6 depicts an example of an experimental error component 600 of a time series that involves a simulated AR(1) error process.

Figure 7:
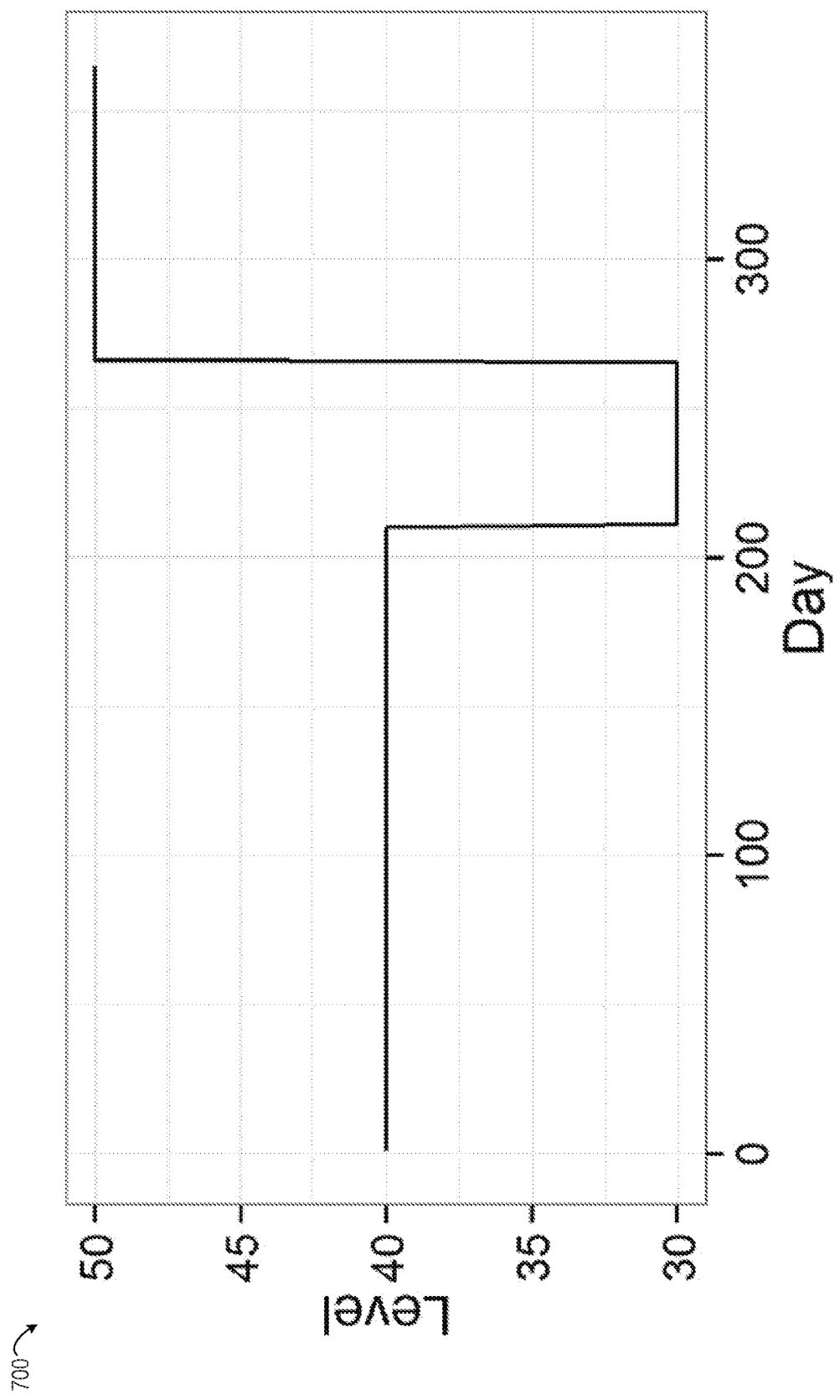
FIG. 7 depicts an example of an experimental level component of a time series, according to certain embodiments.

In the SD dataset, the level component series contained structural breaks, with the number of breaks being between 1% and 5% of the total length N of the corresponding time series, subject to a maximum of five breaks. The break locations were chosen at random without replacement from $\{10, 15, \ldots, N-5\}$. The new level after a break was chosen at random with replacement from $\{30, 40, 50, 60, 70\}$. FIG. 7 depicts an example of an experimental level component 700 of a time series having two changes in the level. (The SD-L dataset was derived from the SD dataset by ignoring the various level changes.)

Figure 8:
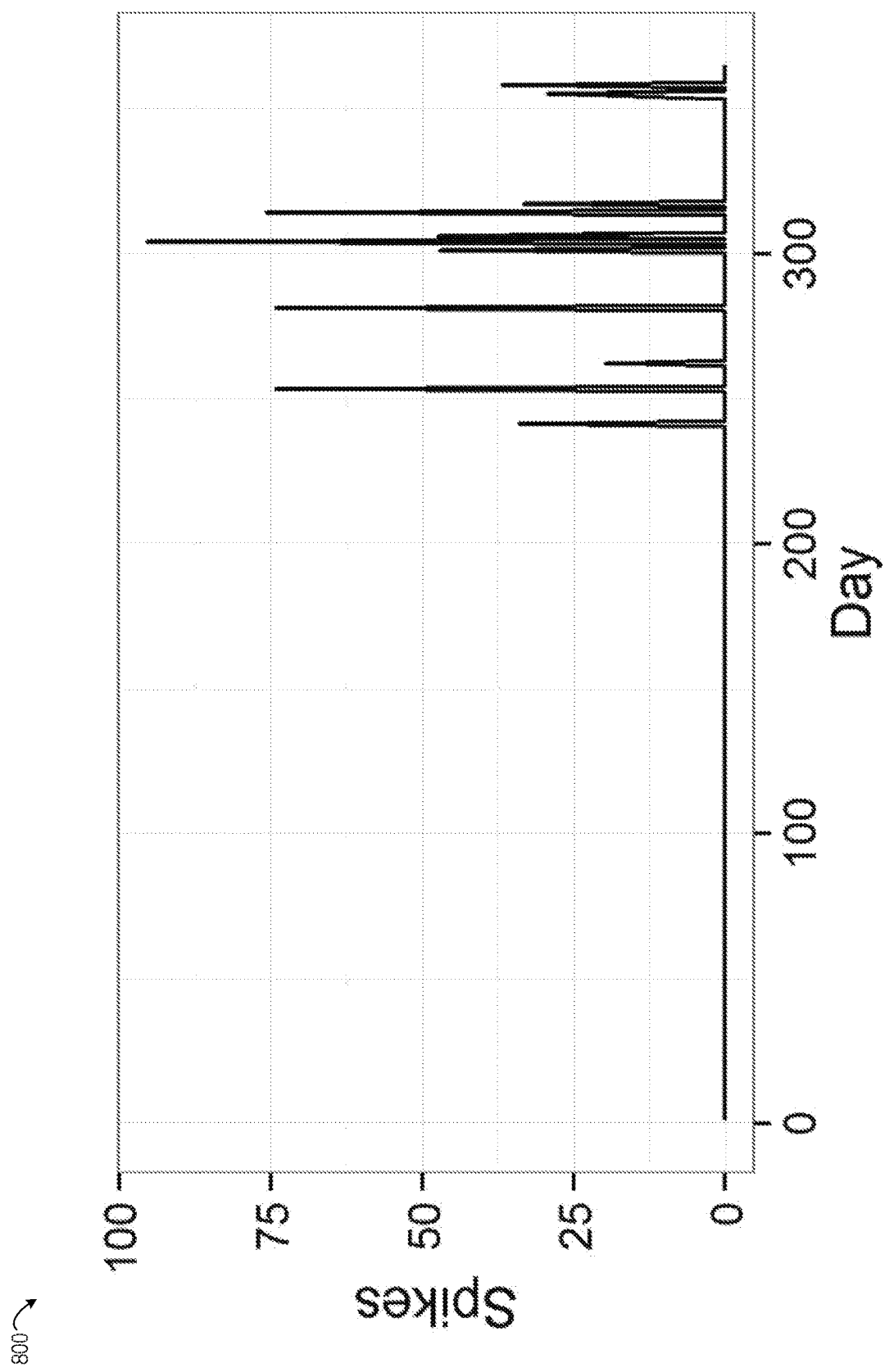
FIG. 8 depicts an example of an experimental spike component of a time series, according to certain embodiments.

In the SD dataset, additive spikes of different densities were used to emulate anomaly realizations. A quarter of the time series had no anomalies, another quarter had one anomaly, and the other two quarters of the time series respectively had 3% and 5% of the observations as anomalies. The spike locations were chosen at random without replacement from the time series index set. The magnitude of each anomaly was set as a percentage of the level plus error plus season, where the percentage was drawn at random from a uniform (35,200) distribution. FIG. 8 depicts an example of an experimental spike component 800 of a time series.

Figure 9:
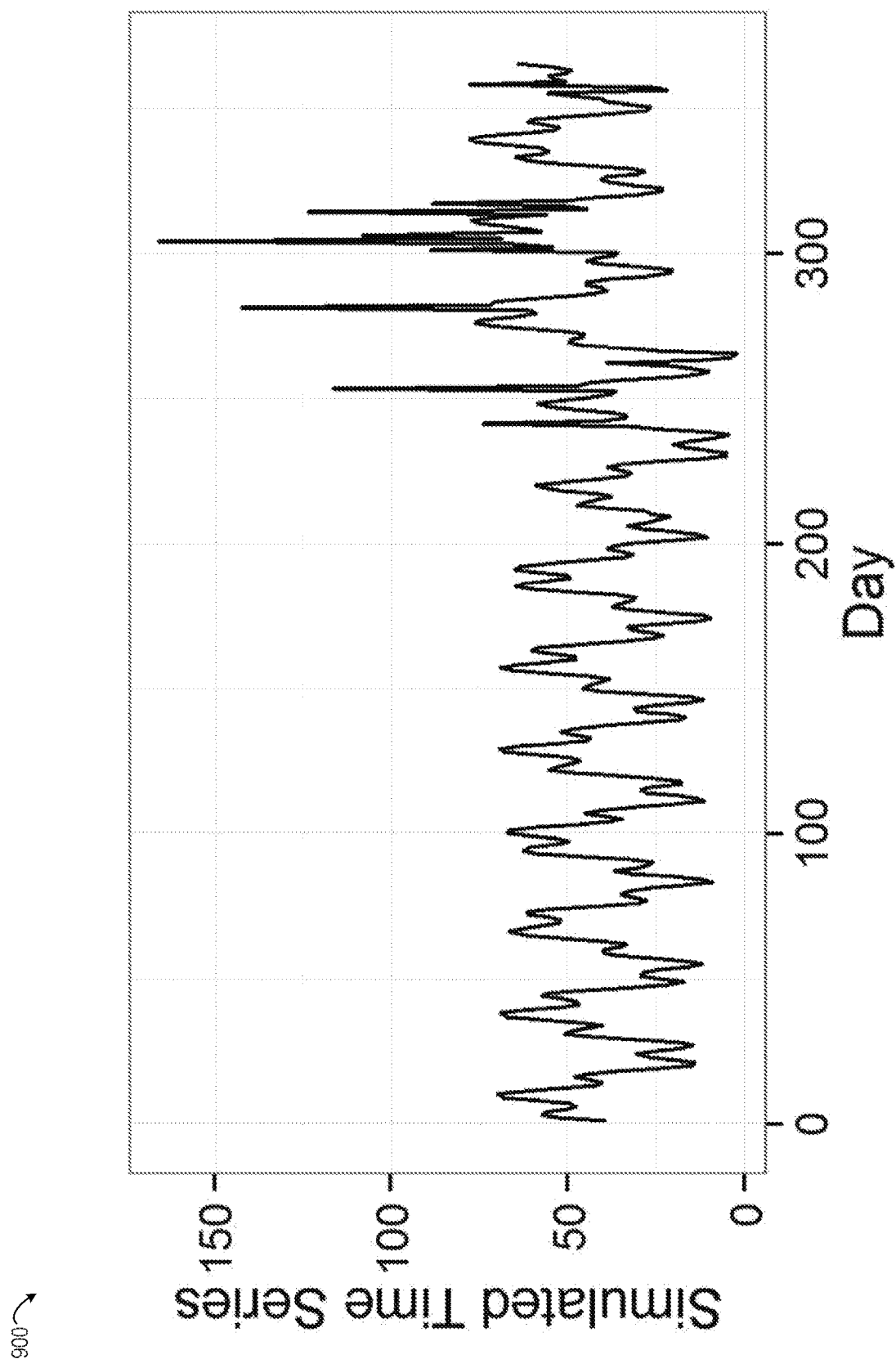
FIG. 9 depicts an example of an experimental time series obtained by adding the time series components in FIGS. 5-8, according to certain embodiments.

In the SD dataset, time series with lengths 180, 245, 300, and 365 were considered. The SD dataset included 48 different combinations across the above five aspects. For each unique combination, ten different time series were generated for realizations to remove the possibility of sampling bias in results. FIG. 9 depicts an example of an experimental time series 900 obtained by adding the time series components in FIGS. 5-8.

The NAB Dataset contained both real-world and synthetic time series, including 58 different scalar valued time series with labelled anomalies. The NAB Dataset provides a reference dataset for research into anomaly detection on streaming data. The part of this dataset based on real-world observations was taken from different online services (e.g., web server metrics, social media post volumes, web advertisement click metrics, city traffic data, etc.). The NAB Dataset contained a long time series with only a handful of data points tagged as anomalous (e.g., approximately 1.6× 104 data points, out of which only two data points were tagged as anomalous).

The NAB-HR Dataset was created from the time series in the NAB dataset that had hourly and half-hourly granularities. Hourly and half-hourly time series show daily and weekly seasonal patterns. A total of eight such time series were included in the NAB dataset. These eight time series were broken into non-overlapping windows of approximately 1000 data points each. This resulted in a total of 37 hourly and half-hourly time series.

The WM dataset was a real-world dataset. Each time series in this dataset represented the number of daily visits on a website. Overall, the WM dataset was taken from metrics regarding 58 different websites spanning across a variety of industry verticals (e.g., e-commerce, finance, publishing, automobile, etc.). For each website, two different window lengths were chosen, viz. 50 and 55 days and two distinct forecasting horizons of 7 and 10 days. This provided four time series per website and a total of 58×4=232 web analytic time series. Since this dataset does not have labeled spikes or change points, this dataset was used for studying forecasting performance.

With respect to time series modeling for web analytics data and the resulting web metrics datasets, websites typically generate hundreds of thousands of time series metrics to measure the traffic, consumer behavior, product and channel performance, etc. Based on the application, the data could be tracked at multiple granularities (e.g., hourly, daily, weekly, etc.). Web analytics time series show complex seasonality, unexpected spikes and sudden changes in level. Thus, autonomous and robust performance of anomaly detection and forecasting algorithms is highly desirable.

The M3 Dataset contained 3003 time series categorized into six different types: micro, macro, industry, finance, demographic, and other. Further, four different granularities existed in the M3 dataset (i.e., yearly, quarterly, monthly and other). The length of the time series depended on the granularity of observations. In particular, at least 14 observations existed for yearly data, 16 observations existed for quarterly data, 48 observations existed for monthly data, and 60 observations existed for data of any other granularity. This dataset was used to study forecasting performance and robustness in the presence of spikes in the observation window. Since such spikes were either absent or unlabeled in the M3 dataset, a small percentage of anomalies (between 0% to 10% of the length of the time series) were introduced at random by randomly selecting the desired number of time points of the time series and increasing the observed magnitudes at those time points at random by some percent between 50% and 200%.

The forecasting time horizons used on the different time series in the dataset differed for different granularities. The forecasting horizons (across all algorithms being compared) for six periods in case of yearly data, eight periods in case of quarterly data, eighteen periods in case of monthly data, and eight periods in case the data showed any other level of granularity.

In the following discussion, the term "Alg-S" refers to an algorithm implementing one or more embodiments described herein. The CVXPY package (for disciplined convex programming in the Python programming language was used to solve the SOCP at the first stage of Alg-S. The auto.arima library (for fitting ARMA models in the R programming language) was used at the second stage of the algorithm to fit the ARMA model parameters for statistical anomaly testing.

A first existing algorithm considered was an anomaly detection algorithm that is designated with the shorthand Alg-T in this discussion. The implementation was based on Seasonal Hybrid Extreme Studentized Deviate ("S-H-ESD"), built upon GESD. A second existing algorithm was also considered in which Alg-T was modified by inputting allowed type-I error rate plus actual % of anomalies as the maximum number of anomalies. This version of the algorithm is designated as Alg-TA. A limitation of both Alg-T and Alg-TA is that both algorithms need the seasonal frequency of the input time series to be specified upfront. This specification of the seasonal frequency prevents these models from accounting for multiple seasonal frequencies, which are commonplace in the time series data. For example, a daily time series is likely to follow a weekly and a monthly seasonal pattern. In the experiments, the seasonality information was proved as an input for both the Alg-T and Alg-TA versions.

A third algorithm considered was an ETS algorithm designated herein as Alg-ETS, used for time series forecasting. Alg-ETS searches more than 30 time series models accounting for additive or multiplicative error, additive or multiplicative seasonality, and additive and/or multiplicative level. A fourth algorithm considered was the ARIMA forecasting algorithm, designated herein as Alg-ARIMA.

Since the anomaly detection problem is about taking the decision as to the presence or absence of an anomaly, a reasonable choice of performance metric is given by the duo defined by the type-I (false alarm) and type-II (mis-detection) errors. The performance of a traditional supervised classification task was evaluated using precision and recall. However, these measures may not be well-suited for unsupervised anomaly-detection tasks. The choice of type-I error can have a dramatic impact on precision and recall, which is difficult to interpret. For this reason, the experiment used type-I and type-II error values to compare the algorithms. An estimated type-I error should be close to the choice of type-I error (0.05 in this case) and the best performing algorithm should have the lowest type-II error.

Table 1 includes examples of anomaly detection results for the Alg-S, Alg-T and Alg-TA algorithms in terms of all four performance metrics for the datasets SD, SD-L, NAB and NAB-HR. In all the competing algorithms, the level of statistical significance with which to accept or reject anomalies is equal to 0.05.

TABLE 1

Evaluation Metrics For Anomaly Detection

| Dataset | Method | Type-I | Type-II | Precision | Recall |
| --- | --- | --- | --- | --- | --- |
| SD | Alg-S | 0.0373 | 0.0199 | 0.2409 | 0.9801 |
|  | Alg-T | 0.0398 | 0.3731 | 0.1596 | 0.6269 |
|  | Alg-TA | 0.0217 | 0.3782 | 0.2562 | 0.6217 |
| SD-L | Alg-S | 0.0790 | 0.0103 | 0.1314 | 0.9897 |
|  | Alg-T | 0.0003 | 0.2282 | 0.9694 | 0.7718 |
|  | Alg-TA | 0.0001 | 0.2538 | 0.9932 | 0.7462 |
| NAB | Alg-S | 0.0662 | 0.2821 | 0.0219 | 0.7179 |
|  | Alg-T | 0.0696 | 0.2949 | 0.0205 | 0.7051 |
|  | Alg-TA | 0.0408 | 0.3077 | 0.0338 | 0.6923 |
| NAB-HR | Alg-S | 0.0553 | 0.3200 | 0.0096 | 0.6800 |
|  | Alg-T | 0.0529 | 0.3600 | 0.0094 | 0.6400 |
|  | Alg-TA | 0.0326 | 0.3600 | 0.0151 | 0.6400 |

The comparison of the anomaly detection algorithm shows that the Alg-S provides improvement, even when the baseline algorithms are provided with some correct inputs based on ground truth and despite Alg-S lacking information about the seasonal frequencies or maximum number of anomalies. Furthermore, in the experiments, Alg-S provided a large improvement over the baseline algorithms, including in cases involving complex seasonality or changes in levels.

The results corresponding to SD dataset in Table 1 suggest that the Alg-S algorithm achieved a healthy balance between type-I and type-II errors at 3.73% and 1.99% respectively. In contrast, the Alg-T algorithm requires additional information in the form of specification of seasonal frequency and also performs worse on both type-I and type-II errors (despite this additional information being available), at 3.98% and 37.31% respectively. For the Alg-TA algorithm, the exact number of anomalies is also known. Furthermore, type-II errors for Alg-TA are slightly higher at 37.82% as compared to those from Alg-T.

Furthermore, the rows corresponding to SD-L dataset in Table 1 suggest that absence of level changes in the dataset significantly helps the performance of the Alg-T and Alg-TA algorithms. The type-II error rate decreases to about 22%-25% in the SD-L dataset from approximately 37% in the SD dataset for these two algorithms. For Alg-S, the absence of level changes results in type-II error rate being reduced to 1% and type-I error rate increasing from 3.73% to 7.90% which is close to the allowed 5% type-I error rate.

The results corresponding to the NAB dataset in Table 1 show that even for this dataset, Alg-S performs better than Alg-T. Although the type-I and type-II error rates for these two algorithms are close (with the numbers for Alg-T being slightly worse), Alg-T requires the seasonality to be specified as additional information for the results shown in Table 1 to materialize. With the maximum number of anomalies also specified as the allowed type-I error rate plus actual % data points, which are anomalous, the type-I error goes down, as seen for the Alg-TA algorithm. But this decrease in the type-I error comes at the expense of an increase in the type-II errors.

The rows corresponding to NAB-HR dataset in Table 1, which compare the results on hourly and half-hourly time series, show that the type-I error for Alg-S and Alg-T are fairly similar, whereas Alg-S is much better at detecting the outliers as shown by lower type-II error. This shows that Alg-S is particularly better in handling multiple seasonal patterns with long time periods. The results do not change even when the maximum number of anomalies input is provided to the Alg-TA algorithm.

In these experiments, the forecasting performance, which involves predicting the time series as accurately as possible in the near future, was evaluated using root mean squared error ("RMSE") as a performance metric. For the two datasets, the forecasting RMSE was calculated for each algorithm on each of the 232 plus 3003 time series, with the "winning" algorithm achieving the least RMSE. Table 2 shows example of comparative results presented as a percentage of time each algorithm was the winner on WM dataset.

TABLE 2

Percentage of Forecasting Wins on the WM Dataset

| | (window length, forecast horizon) | | | | |
|---|---|---|---|---|---|
| Method | (55, 10) | (55, 7) | (50, 10) | (50, 7) | Overall |
| Alg-S | 46.55% | 44.83% | 51.72% | 60.34% | 50.86% |
| Alg-ARIMA | 34.48% | 39.66% | 31.03% | 24.14% | 32.33% |
| Alg-ETS | 18.97% | 15.52% | 17.24% | 15.52% | 16.81% |

For example, the last column of Table 2 shows that the Alg-S algorithm achieved a minimum forecasting RMSE on 50.86% of the 232 time series that are part of the WM dataset, indicating that the performance of Alg-S was better than Alg-ARIMA and Alg-ETS on more than 50% of time series in WM dataset, even though the Alg-S algorithm required no input on the seasonal frequency. The improvement was consistent across the time series length and forecasting horizons. Alg-S provided these results, in part, due to the robustness of Alg-S against spikes.

To illustrate how robustness of an algorithm can impact time series having complex seasonality and spikes, the forecast performance of the three algorithms was compared on the M3 dataset, which has data for different granularities and hence different seasonality. Spikes were added to the original M3 dataset to test how the results change in presence of spikes. Table 3 depicts example of comparative results presented as the percentage of times each algorithm was the winner on some particular modification of the M3 dataset.

TABLE 3

Percentage of Forecasting Wins on the M3-Ax Datasets

| Method | M3 | M3-A2.5 | M3-A5 | M3-A10 |
|---|---|---|---|---|
| Alg-S | 20.00% | 32.17% | 35.93% | 41.20% |
| Alg-ARIMA | 42.86% | 34.83% | 32.55% | 30.13% |
| Alg-ETS | 37.53% | 33.00% | 31.52% | 28.67% |

In these results, Alg-S is the winner on a substantial fraction of the M3-Ax dataset for every $x \in \{2.5, 5, 10\}$. Furthermore, in comparison to the Alg-ARIMA and Alg-ETS methods, Alg-S performed better if the number of artificial anomalous spikes was a smaller percentage of the total length of the time series (with the exception of the M3 dataset where there are no artificially created anomalies).

Table 4 depicts examples of the numbers of wins broken down by the periodicity of the time series present in M3 dataset.

TABLE 4

Wins for Time Series Broken by Granularity In M3-A$_x$ Datasets

| | M3-A$_{2.5}$ | | | M3-A$_5$ | | | M3-A$_{10}$ | | |
|---|---|---|---|---|---|---|---|---|---|
| Interval | Alg-S | Alg-ARIMA | Alg-ETS | Alg-S | Alg-ARIMA | Alg-ETS | Alg-S | Alg-ARIMA | Alg-ETS |
| Year | 146 | 262 | 237 | 160 | 256 | 229 | 193 | 248 | 204 |
| Quarter | 225 | 267 | 264 | 248 | 279 | 229 | 278 | 252 | 226 |
| Month | 522 | 470 | 436 | 583 | 436 | 409 | 676 | 394 | 358 |
| Other | 75 | 43 | 56 | 95 | 23 | 56 | 87 | 27 | 60 |

These results indicate that the Alg-S performs better in time series with monthly granularity than the time series with quarterly and yearly granularities. The reason can be that the monthly granularity time series is more likely to show a seasonal pattern than the other two granularities. Alg-S handled seasonality better and therefore performed better at the monthly granularity than quarterly and yearly granularities. The performance improvement over baselines, when longer seasonality is present in the data, was also seen in the anomaly detection scenario described above. These results establish that embodiments described herein provide an algorithm that is capable of handling anomalies and complex seasonal pattern.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method comprising:
   accessing, by a processing device, a time series having metrics data describing interactions with an online service over a time period;
   decomposing, by the processing device, the time series into latent components comprising a seasonal component series, a level component series, a spike component series, and an error component series, wherein decomposing the time series comprises:
   configuring an optimization algorithm with a constraint indicating that the time series is a sum of the seasonal component series, the level component series, the spike component series, and the error component series,
   executing the optimization algorithm to minimize an objective function subject to the constraint, and
   identifying, from the executed optimization algorithm, the seasonal component series, the level component series, the spike component series, and the error component series that minimize the objective function; and
   outputting, by the processing device, at least some of the latent components for at least one of an anomaly-detection operation or a data-forecasting operation,
   wherein:
      a seasonal term in the objective function is computed by calculating an L1-norm of a frequency transformation of the seasonal component series, wherein the frequency transformation transforms the seasonal component series from a time domain to a frequency domain,
      a level term in the objective function is computed by calculating an L1-norm of a vector populated with differences between adjacent pairs of level values in the level component series, and
      a spike term in the objective function is computed by calculating an L1-norm of the spike component series.

2. The method of claim 1, wherein the objective function is a sum of the seasonal term computed from the seasonal component series, the level term computed from the level component series, and the spike term computed from the spike component series.

3. The method of claim 1, wherein decomposing the time series further comprises configuring the optimization algorithm with a level weight indicating a contribution of the level component series to the time series and a spike weight indicating a contribution of the spike component series to the time series, wherein the level weight is applied to the level term and the spike weight is applied to the spike term.

4. The method of claim 1, further comprising performing, by the processing device, the anomaly-detection operation, the anomaly-detection operation comprising:
   computing error-bound pairs from the error component series, each error-bound pair corresponding to a respective index from the error component series;
   identifying a subset of spike values, wherein each spike value in the subset of spike values is identified based on the spike value being outside a range of spike values bounded by a respective error-bound pair having a common index with respect to the spike value; and
   outputting the identified subset of spike values as an anomaly set.

5. The method of claim 4, wherein computing the error-bound pairs comprises:
   fitting the error component series to an auto-regressive moving average model;
   computing a set of variances from the auto-regressive moving average model; and
   calculating the error-bound pairs from the set of variances.

6. The method of claim 1, further comprising performing, by the processing device, the data-forecasting operation that computes a predicted metrics time series over a subsequent time period, the data-forecasting operation comprising:
   computing a predicted seasonal component series based on one or more frequency components of the seasonal component series;
   setting values of a predicted level component series to a level value selected from the level component series; and
   combining the predicted seasonal component series and the predicted level component series into the predicted metrics time series.

7. The method of claim 6, wherein the data-forecasting operation further comprises computing a predicted error component series based on an auto-regressive moving average model to which the error component series is fitted and combining the predicted error component series with the predicted seasonal component series and the predicted level component series into the predicted metrics time series.

8. The method of claim 1, further comprising outputting, by the processing device, a graphical interface having visualization graphics depicting one or more of the seasonal component series, the level component series, and the spike component series.

9. The method of claim 1, further comprising configuring the optimization algorithm with an error constraint providing an upper bound on an energy of the error component series.

10. A system comprising:
    a processing device; and
    a non-transitory computer-readable medium communicatively coupled to the processing device, wherein the processing device is configured to execute program stored in the non-transitory computer-readable medium, wherein the processing device, as configured by executing the program code, performs operations comprising:
       accessing a time series having metrics data describing interactions with an online service over a time period;
       decomposing the time series into latent components comprising a seasonal component series, a level component series, a spike component series, and an error component series, wherein decomposing the time series comprises:

configuring an optimization algorithm with a constraint indicating that the time series is a sum of the seasonal component series, the level component series, the spike component series, and the error component series, executing the optimization algorithm to minimize an objective function subject to the constraint, and identifying, from the executed optimization algorithm, the seasonal component series, the level component series, the spike component series, and the error component series that minimize the objective function; and outputting at least some of the latent components for at least one of an anomaly-detection operation or a data-forecasting operation, wherein:

a seasonal term in the objective function is computed by calculating an L1-norm of a frequency transformation of the seasonal component series, wherein the frequency transformation transforms the seasonal component series from a time domain to a frequency domain, a level term in the objective function is computed by calculating an L1-norm of a vector populated with differences between adjacent pairs of level values in the level component series, and a spike term in the objective function is computed by calculating an L1-norm of the spike component series.

11. The system of claim 10, wherein the objective function is a sum of the seasonal term computed from the seasonal component series, the level term computed from the level component series, and the spike term computed from the spike component series, wherein the operations further comprise configuring the optimization algorithm with an error constraint providing an upper bound on an energy of the error component series.

12. The system of claim 11, wherein decomposing the time series further comprises configuring the optimization algorithm with a level weight indicating a contribution of the level component series to the time series and a spike weight indicating a contribution of the spike component series to the time series, wherein the level weight is applied to the level term and the spike weight is applied to the spike term.

13. The system of claim 10, the operations further comprising performing the anomaly-detection operation, the anomaly-detection operation comprising:

computing error-bound pairs from the error component series, each error-bound pair corresponding to a respective index from the error component series, wherein computing the error-bound pairs comprises:

fitting the error component series to an auto-regressive moving average model;

computing a set of variances from the auto-regressive moving average model; and calculating the error-bound pairs from the set of variances;

identifying a subset of spike values, wherein each spike value in the subset of spike values is identified based on the spike value being outside a range of spike values bounded by a respective error-bound pair having a common index with respect to the spike value; and outputting the identified subset of spike values as an anomaly set.

14. The system of claim 10, the operations further comprising performing the data-forecasting operation that computes a predicted metrics time series over a subsequent time period, the data-forecasting operation comprising:

computing a predicted seasonal component series based on one or more frequency components of the seasonal component series;

setting values of a predicted level component series to a level value selected from the level component series; and combining the predicted seasonal component series and the predicted level component series into the predicted metrics time series.

15. A non-transitory computer-readable medium having program code that is stored thereon, the program code executable by one or more processing devices for performing operations comprising:

accessing a time series having metrics data describing interactions with an online service over a time period;

decomposing the time series into latent components comprising a seasonal component series, a level component series, a spike component series, and an error component series, wherein decomposing the time series comprises:

configuring an optimization algorithm with a constraint indicating that the time series is a sum of the seasonal component series, the level component series, the spike component series, and the error component series, a step for executing the optimization algorithm to minimize an objective function subject to the constraint, and a step for identifying, from the executed optimization algorithm, the seasonal component series, the level component series, the spike component series, and the error component series that minimize the objective function; and a step for outputting at least some of the latent components for at least one of an anomaly-detection operation or a data-forecasting operation, wherein:

a seasonal term in the objective function is computed by calculating an L1-norm of a frequency transformation of the seasonal component series, wherein the frequency transformation transforms the seasonal component series from a time domain to a frequency domain, a level term in the objective function is computed by calculating an L1-norm of a vector populated with differences between adjacent pairs of level values in the level component series, and a spike term in the objective function is computed by calculating an L1-norm of the spike component series.

16. The non-transitory computer-readable medium of claim 15, wherein:

the objective function is a sum of the seasonal term computed from the seasonal component series, the level term computed from the level component series, and the spike term computed from the spike component series.

17. The non-transitory computer-readable medium of claim 15, wherein decomposing the time series further comprises configuring the optimization algorithm with a level weight indicating a contribution of the level component series to the time series and a spike weight indicating a contribution of the spike component series to the time series, wherein the level weight is applied to the level term and the spike weight is applied to the spike term.

18. The non-transitory computer-readable medium of claim 15, the operations further comprising performing the anomaly-detection operation, the anomaly-detection operation comprising:
  computing error-bound pairs from the error component series, each error-bound pair corresponding to a respective index from the error component series, wherein computing the error-bound pairs comprises:
    fitting the error component series to an auto-regressive moving average model,
    computing a set of variances from the auto-regressive moving average model, and
    calculating the error-bound pairs from the set of variances;
  identifying a subset of spike values, wherein each spike value in the subset of spike values is identified based on the spike value being outside a range of spike values bounded by a respective error-bound pair having a common index with respect to the spike value; and
  outputting the identified subset of spike values as an anomaly set.

* * * * *